(12) United States Patent
Herrington et al.

(10) Patent No.: US 11,633,700 B2
(45) Date of Patent: Apr. 25, 2023

(54) INDEPENDENT SPACERS AND METHODS

(71) Applicant: Aqua Membranes Inc., Albuquerque, NM (US)

(72) Inventors: Rodney Herrington, Albuquerque, NM (US); Craig Beckman, Albuquerque, NM (US); Jay Collin Weingardt, Albuquerque, NM (US); Jay Kendall Weingardt, Albuquerque, NM (US); Kevin Roderick, Albuquerque, NM (US)

(73) Assignee: Aqua Membranes Inc., Albuquerque, NM (US)

( * ) Notice: Subject to any disclaimer, the term of this patent is extended or adjusted under 35 U.S.C. 154(b) by 0 days.

(21) Appl. No.: 17/431,705

(22) PCT Filed: Apr. 6, 2021

(86) PCT No.: PCT/US2021/026030
§ 371 (c)(1),
(2) Date: Aug. 17, 2021

(87) PCT Pub. No.: WO2021/207256
PCT Pub. Date: Oct. 14, 2021

(65) Prior Publication Data
US 2023/0014014 A1     Jan. 19, 2023

Related U.S. Application Data

(60) Provisional application No. 63/056,135, filed on Jul. 24, 2020, provisional application No. 63/006,638, filed on Apr. 7, 2020.

(51) Int. Cl.
*B01D 63/10* (2006.01)
*B01D 67/00* (2006.01)
(Continued)

(52) U.S. Cl.
CPC ....... *B01D 63/101* (2022.08); *B01D 67/0081* (2013.01); *B01D 2313/14* (2013.01);
(Continued)

(58) Field of Classification Search
CPC ...... B01D 63/10; B01D 63/101; B01D 67/00; B01D 67/0081; B01D 2313/14;
(Continued)

(56) References Cited

U.S. PATENT DOCUMENTS

| | | | |
|---|---|---|---|
| 3,963,621 A | 6/1976 | Newman | |
| 4,187,173 A | 2/1980 | Keefer | |

(Continued)

FOREIGN PATENT DOCUMENTS

| | | |
|---|---|---|
| CA | 2662925 A1 | 1/2009 |
| CA | 2825674 C | 8/2011 |

(Continued)

OTHER PUBLICATIONS

Schwinge et al., "Spiral Wound Modules and Spacers", 2004, Journal of Membrane Science, vol. 242, No. 1-2.
(Continued)

*Primary Examiner* — Philip C Tucker
*Assistant Examiner* — Brian R Slawski
(74) *Attorney, Agent, or Firm* — V Gerald Grafe

(57) ABSTRACT

Methods of making membrane elements for fluid or gas filtration, comprising applying feed or reject spacers, or intermediate spacers, or fold line protection strips, or end support strips directly to a membrane sheet, or to a substrate material which are subsequently applied to a membrane sheet, which thereby avoids contamination from directly printed adhesives, inks, or polymers, or damage from heat or radiation damage to the membrane sheet during direct application of spacers or patterns to the surface of the membrane sheet, thereby avoiding utilization of conven- (Continued)

tional feed spacer mesh materials. Membrane sheets and spiral wound filtration elements having spacers applied to defined regions of the sheet, in some embodiments having spacers mounted on substrates with different material properties, e.g., stiffness, than the underlying membrane.

11 Claims, 21 Drawing Sheets

(51) Int. Cl.
  B29C 65/48 (2006.01)
  B29C 65/00 (2006.01)
  B32B 38/10 (2006.01)
  B32B 38/00 (2006.01)
(52) U.S. Cl.
  CPC .............. B29C 65/48 (2013.01); B29C 66/41 (2013.01); B29C 66/4722 (2013.01); B29C 66/727 (2013.01); B32B 38/0004 (2013.01); B32B 38/10 (2013.01)
(58) Field of Classification Search
  CPC ........ B01D 2313/143; B01D 2313/146; B32B 38/00; B32B 38/0004; B32B 38/10; B29C 65/48; B29C 66/41; B29C 66/47; B29C 66/472; B29C 66/4722; B29C 66/727
  USPC ... 156/60, 65, 184, 185, 187, 188, 190, 191, 156/192, 247, 248, 249, 250, 256, 257, 156/264, 265, 268, 269, 292, 297, 299, 156/302; 210/650, 321.83, 321.84
  See application file for complete search history.

(56) References Cited

U.S. PATENT DOCUMENTS

| | | |
|---|---|---|
| 4,208,289 A | 6/1980 | Bray |
| 4,222,874 A | 9/1980 | Connelly |
| 4,228,014 A | 10/1980 | Timm et al. |
| 4,230,564 A | 10/1980 | Keefer |
| 4,230,579 A | 10/1980 | Bray et al. |
| 4,235,723 A | 11/1980 | Bartlett, Jr. |
| 4,277,340 A | 7/1981 | Kanamaru et al. |
| 4,288,326 A | 9/1981 | Keefer |
| 4,309,287 A | 1/1982 | Roos et al. |
| 4,326,960 A | 4/1982 | Iwahori et al. |
| 4,341,631 A | 7/1982 | Hargitay |
| 4,347,132 A | 8/1982 | Davis |
| 4,354,939 A | 10/1982 | Pohl |
| 4,358,377 A | 11/1982 | Clark |
| 4,409,849 A | 10/1983 | Roos |
| 4,410,429 A | 10/1983 | Harvey et al. |
| 4,411,785 A | 10/1983 | Yu et al. |
| 4,426,285 A | 1/1984 | Davis |
| 4,434,056 A | 2/1984 | Keefer |
| 4,454,891 A | 6/1984 | Dreibelbis et al. |
| 4,461,707 A | 7/1984 | Thayer et al. |
| 4,476,022 A | 10/1984 | Doll |
| 4,482,459 A | 11/1984 | Shiver |
| 4,534,713 A | 8/1985 | Wanner |
| 4,556,488 A | 12/1985 | Timm et al. |
| 4,585,554 A | 4/1986 | Burrows |
| RE32,144 E | 5/1986 | Keefer |
| 4,595,497 A | 6/1986 | Burrows |
| 4,599,171 A | 7/1986 | Padilla et al. |
| 4,600,512 A | 7/1986 | Aid |
| 4,608,140 A | 8/1986 | Goldstein |
| 4,613,436 A | 9/1986 | Wight et al. |
| 4,623,451 A | 11/1986 | Oliver |
| 4,623,467 A | 11/1986 | Hamlin |
| 4,640,774 A | 2/1987 | Garcera et al. |
| 4,645,601 A | 2/1987 | Regunathan et al. |
| 4,652,373 A | 3/1987 | Trimmer |
| 4,657,674 A | 4/1987 | Burrows |
| 4,670,144 A | 6/1987 | McCausland et al. |
| 4,695,375 A | 9/1987 | Tyler |
| 4,704,324 A | 11/1987 | Davis et al. |
| 4,705,625 A | 11/1987 | Hart, Jr. |
| 4,735,716 A | 4/1988 | Petrucci et al. |
| 4,735,718 A | 4/1988 | Peters |
| 4,741,823 A | 5/1988 | Olsen et al. |
| 4,743,366 A | 5/1988 | Burrows |
| 4,744,895 A | 5/1988 | Gales et al. |
| 4,744,900 A | 5/1988 | Bratt |
| 4,756,835 A | 7/1988 | Wilson |
| 4,775,465 A | 10/1988 | Burrows |
| 4,781,831 A | 11/1988 | Goldsmith |
| 4,784,771 A | 11/1988 | Wathen et al. |
| 4,802,982 A | 2/1989 | Lien |
| 4,814,079 A | 3/1989 | Schneider |
| 4,820,413 A | 4/1989 | Lopez |
| 4,830,744 A | 5/1989 | Burrows |
| 4,832,850 A | 5/1989 | Cais et al. |
| 4,834,873 A | 5/1989 | Burrows |
| 4,842,725 A | 6/1989 | Blad et al. |
| 4,842,736 A | 6/1989 | Bray |
| 4,844,805 A | 7/1989 | Solomon |
| 4,855,058 A | 8/1989 | Holland et al. |
| 4,856,559 A | 8/1989 | Lipshultz et al. |
| 4,869,821 A | 9/1989 | Korin |
| 4,874,514 A | 10/1989 | Casey Jr. |
| 4,876,002 A | 10/1989 | Marshall et al. |
| 4,877,521 A | 10/1989 | Petrucci et al. |
| 4,882,061 A | 11/1989 | Petrucci et al. |
| 4,882,223 A | 11/1989 | Aptel et al. |
| RE33,135 E | 12/1989 | Wanner, Sr. et al. |
| 4,885,092 A | 12/1989 | Zwick |
| 4,886,597 A | 12/1989 | Wild et al. |
| 4,892,657 A | 1/1990 | Mohn et al. |
| 4,902,417 A | 2/1990 | Lien |
| 4,906,372 A | 3/1990 | Hopkins |
| 4,917,847 A | 4/1990 | Solomon |
| 4,937,557 A | 6/1990 | Tucci et al. |
| 4,944,877 A | 7/1990 | Maples |
| 4,988,525 A | 1/1991 | Gresch |
| 4,990,248 A | 2/1991 | Brown et al. |
| 4,992,170 A | 2/1991 | Menon et al. |
| 4,995,977 A | 2/1991 | Hilgendorff et al. |
| 5,002,664 A | 3/1991 | Clack et al. |
| 5,017,284 A | 5/1991 | Miler et al. |
| 5,043,066 A | 8/1991 | Miller et al. |
| 5,045,197 A | 9/1991 | Burrows |
| 5,057,212 A | 10/1991 | Burrows |
| 5,069,789 A | 12/1991 | Mohn et al. |
| 5,078,876 A | 1/1992 | Whittier et al. |
| 5,094,749 A | 3/1992 | Seita et al. |
| 5,096,574 A | 3/1992 | Birdsong et al. |
| 5,104,532 A | 4/1992 | Thompson et al. |
| 5,108,604 A | 4/1992 | Robbins |
| 5,128,035 A | 7/1992 | Clack et al. |
| 5,131,277 A | 7/1992 | Birdsong et al. |
| 5,132,017 A | 7/1992 | Birdsong et al. |
| 5,145,575 A | 9/1992 | Burrows |
| 5,167,786 A | 12/1992 | Eberle |
| 5,167,826 A | 12/1992 | Eaton |
| 5,183,567 A | 2/1993 | Mohn et al. |
| 5,194,156 A | 3/1993 | Tomchak |
| 5,198,110 A | 3/1993 | Hanai et al. |
| 5,204,002 A | 4/1993 | Belfort et al. |
| 5,232,591 A | 8/1993 | Solomon |
| 5,234,583 A | 8/1993 | Cluff |
| 5,240,612 A | 8/1993 | Grangeon et al. |
| 5,279,732 A | 1/1994 | Edens |
| 5,296,148 A | 3/1994 | Colangelo et al. |
| 5,354,464 A | 10/1994 | Slovak et al. |
| 5,362,383 A | 11/1994 | Zimmerman et al. |
| 5,462,414 A | 10/1995 | Permar |
| 5,466,366 A | 11/1995 | Chia-ching |
| 5,468,387 A | 11/1995 | Solomon |
| 5,507,943 A | 4/1996 | Labrador |
| RE35,252 E | 5/1996 | Clack et al. |
| 5,545,320 A | 8/1996 | Heine et al. |

(56) References Cited

U.S. PATENT DOCUMENTS

| | | |
|---|---|---|
| 5,573,662 A | 11/1996 | Abe et al. |
| 5,597,487 A | 1/1997 | Vogel et al. |
| 5,626,752 A | 5/1997 | Mohn et al. |
| 5,626,758 A | 5/1997 | Belfort |
| 5,628,198 A | 5/1997 | Permar |
| 5,681,459 A | 10/1997 | Bowman |
| 5,681,467 A | 10/1997 | Solie et al. |
| 5,788,858 A | 8/1998 | Acernese et al. |
| 5,795,475 A | 8/1998 | Luedke et al. |
| 5,811,251 A | 9/1998 | Hirose et al. |
| 5,824,217 A | 10/1998 | Pearl et al. |
| 5,914,041 A | 6/1999 | Chancellor |
| 5,944,985 A | 8/1999 | Bowman |
| 5,985,146 A | 11/1999 | Knappe et al. |
| 6,030,535 A | 2/2000 | Hayashi et al. |
| 6,071,404 A | 6/2000 | Tsui |
| 6,071,414 A | 6/2000 | Kishi |
| 6,099,735 A | 8/2000 | Kelada |
| 6,109,029 A | 8/2000 | Vowles et al. |
| 6,110,360 A | 8/2000 | Hart, Jr. |
| 6,117,297 A | 9/2000 | Goldstein |
| 6,120,682 A | 9/2000 | Cook |
| 6,126,833 A | 10/2000 | Stobbe et al. |
| 6,174,437 B1 | 1/2001 | Haney |
| 6,190,557 B1 | 2/2001 | Hisada et al. |
| 6,193,879 B1 | 2/2001 | Bowman |
| 6,197,191 B1 | 3/2001 | Wobben |
| 6,217,773 B1 | 4/2001 | Graham |
| 6,258,270 B1 | 7/2001 | Hilgendorff et al. |
| 6,277,282 B1 | 8/2001 | Kihara et al. |
| 6,299,766 B1 | 10/2001 | Permar |
| 6,345,961 B1 | 2/2002 | Oklejas, Jr. |
| 6,348,148 B1 | 2/2002 | Bosley |
| 6,379,518 B1 | 4/2002 | Osawa et al. |
| 6,379,548 B1 | 4/2002 | Kurokawa et al. |
| 6,383,384 B1 | 5/2002 | Anderson |
| RE37,759 E | 6/2002 | Belfort |
| 6,402,956 B1 | 6/2002 | Andou et al. |
| 6,423,212 B1 | 7/2002 | Bosko |
| 6,423,223 B1 | 7/2002 | Northcut et al. |
| 6,432,301 B1 | 8/2002 | Dengler |
| 6,436,282 B1 | 8/2002 | Gundrum et al. |
| 6,447,259 B2 | 9/2002 | Elliott-Moore |
| 6,514,398 B2 | 2/2003 | DiMascio et al. |
| 6,521,124 B2 | 2/2003 | Northcut et al. |
| 6,521,127 B1 | 2/2003 | Chancellor |
| 6,524,478 B1 | 2/2003 | Heine et al. |
| 6,540,915 B2 | 4/2003 | Patil |
| 6,575,308 B1 | 6/2003 | Fuls et al. |
| 6,579,451 B1 | 6/2003 | Avero |
| 6,607,668 B2 | 8/2003 | Rela |
| 6,613,231 B1 | 9/2003 | Jitariouk |
| 6,632,357 B1 | 10/2003 | Barger et al. |
| 6,790,345 B2 | 9/2004 | Broussard |
| 6,805,796 B2 | 10/2004 | Hirose et al. |
| 6,830,683 B2 | 12/2004 | Gundrum et al. |
| 6,866,831 B2 | 3/2005 | Nakao et al. |
| 6,929,743 B2 | 8/2005 | Diel |
| 6,929,748 B2 | 8/2005 | Avijit et al. |
| 7,021,667 B2 | 4/2006 | Campbell et al. |
| 7,186,331 B2 | 3/2007 | Maartens et al. |
| 7,244,357 B2 | 7/2007 | Herrington et al. |
| 7,297,268 B2 | 11/2007 | Herrington et al. |
| 7,306,437 B2 | 12/2007 | Hauge |
| 7,311,831 B2 | 12/2007 | Bradford et al. |
| 7,351,335 B2 | 4/2008 | Broens et al. |
| 7,387,725 B2 | 6/2008 | Choi et al. |
| 7,416,666 B2 | 8/2008 | Gordon |
| 7,449,093 B2 | 11/2008 | Dudziak et al. |
| 7,455,778 B2 | 11/2008 | Gordon |
| 7,501,064 B2 | 3/2009 | Schmidt et al. |
| 7,514,010 B2 | 4/2009 | Salmon |
| 7,520,981 B2 | 4/2009 | Barber |
| 7,540,956 B1 | 6/2009 | Kurth et al. |
| 7,650,805 B2 | 1/2010 | Nauseda et al. |
| 7,733,459 B2 | 6/2010 | Dierichs et al. |
| 7,736,503 B2 | 6/2010 | Kennedy et al. |
| 7,862,723 B2 | 1/2011 | Cartwright |
| 7,875,184 B2 | 1/2011 | Parker et al. |
| 7,892,429 B2 | 2/2011 | Oklejas, Jr. |
| 7,901,580 B2 | 3/2011 | Salyer |
| 7,909,998 B2 | 3/2011 | Kennedy et al. |
| 7,910,004 B2 | 3/2011 | Cohen et al. |
| 7,927,082 B2 | 4/2011 | Haudenschild |
| 7,981,293 B2 | 7/2011 | Powell |
| 8,021,550 B2 | 9/2011 | Beauchamp et al. |
| 8,101,074 B2 | 1/2012 | Larsen |
| 8,114,286 B2 | 2/2012 | Kawakami |
| 8,147,699 B2 | 4/2012 | Goldsmith |
| 8,257,594 B2 | 9/2012 | Astle et al. |
| 8,282,823 B2 | 10/2012 | Acernese et al. |
| 8,292,088 B2 | 10/2012 | Francisco et al. |
| 8,292,492 B2 | 10/2012 | Ho et al. |
| 8,414,767 B2 | 4/2013 | Gaignet et al. |
| 8,425,734 B2 | 4/2013 | Goel et al. |
| 8,454,829 B2 | 6/2013 | Yaeger |
| 8,506,685 B2 | 8/2013 | Taylor et al. |
| 8,518,225 B2 | 8/2013 | Sumita et al. |
| 8,628,642 B2 | 1/2014 | Goel et al. |
| 8,652,326 B2 | 2/2014 | Johann et al. |
| 8,685,252 B2 | 4/2014 | Vuong et al. |
| 8,696,904 B2 | 4/2014 | Thiyagarajan et al. |
| 8,771,510 B2 | 7/2014 | Takahashi et al. |
| 8,778,055 B2 | 7/2014 | Taylor et al. |
| 8,808,538 B2 | 8/2014 | Oklejas, Jr. |
| 8,889,009 B2 | 11/2014 | Brausch et al. |
| 8,944,257 B2 | 2/2015 | Eisen et al. |
| 8,961,790 B2 | 2/2015 | Beauchamp et al. |
| 8,968,566 B2 | 3/2015 | Beauchamp et al. |
| 8,999,162 B2 | 4/2015 | Vuong et al. |
| 9,011,664 B2 | 4/2015 | Takahashi et al. |
| 9,011,688 B2 | 4/2015 | Takahashi et al. |
| 9,108,162 B2 | 8/2015 | Takahashi et al. |
| 9,114,365 B2 | 8/2015 | Schmitt |
| 9,260,325 B2 | 2/2016 | Takahashi et al. |
| 9,328,743 B2 | 5/2016 | Hirosawa et al. |
| 9,387,445 B2 | 7/2016 | Kimura et al. |
| 9,403,125 B2 | 8/2016 | Shaffer |
| 9,475,008 B2 | 10/2016 | Salama et al. |
| 9,492,792 B2 | 11/2016 | Tomescu et al. |
| 9,546,671 B2 | 1/2017 | Hirosawa et al. |
| 9,597,640 B2 | 3/2017 | Koiwa et al. |
| 9,616,390 B2 | 4/2017 | Hirozawa et al. |
| 9,617,172 B1 | 4/2017 | Baski |
| 9,724,646 B2 | 8/2017 | Okamoto et al. |
| 9,731,984 B2 | 8/2017 | Beall |
| 9,758,389 B2 | 9/2017 | Rau, III |
| 9,764,291 B2 | 9/2017 | Hirozawa et al. |
| 9,808,767 B2 | 11/2017 | Tabayashi et al. |
| 2008/0290031 A1 | 11/2008 | Popa |
| 2010/0051546 A1 | 3/2010 | Vuong |
| 2011/0036774 A1 | 2/2011 | McGinnis |
| 2012/0103892 A1 | 5/2012 | Beauchamp et al. |
| 2013/0101797 A1 | 4/2013 | Dontula |
| 2013/0334128 A1 | 12/2013 | Takagi et al. |
| 2015/0375173 A1 | 12/2015 | Steen |
| 2016/0008763 A1 | 1/2016 | Roderick et al. |
| 2016/0051941 A1 | 2/2016 | Li et al. |
| 2016/0059188 A1 | 3/2016 | Liberman |
| 2016/0236132 A1 | 8/2016 | Hara et al. |
| 2019/0358590 A1 | 11/2019 | Roderick et al. |

FOREIGN PATENT DOCUMENTS

| | | |
|---|---|---|
| EP | 2902094 | 8/2015 |
| JP | H06 262026 | 9/1994 |
| JP | 2009 195871 | 9/2009 |
| JP | 2016 137462 | 8/2016 |
| WO | WO2010047360 A1 | 4/2010 |
| WO | WO2015016253 A1 | 2/2015 |
| WO | WO2002/055179 | 8/2015 |

(56) References Cited

FOREIGN PATENT DOCUMENTS

| WO | WO2016199272 A1 | 12/2016 |
| WO | WO2017087461 A1 | 5/2017 |

OTHER PUBLICATIONS

Evangelista et al., "Optimal Design and Performance of Spiral Wound Modules", 1988, Chem. Eng. Comm., vol. 72, pp. 66-81.

INDEPENDENT SPACERS AND METHODS

CROSS-REFERENCE TO RELATED APPLICATIONS

This application is a national stage application under 35 U.S.C. 371 of PCT application PCT/US21/26030, filed 6 Apr. 2021, which claims priority to U.S. provisional application 63/006,638, filed 7 Apr. 2020, and U.S. provisional application 63/056,135, filed 24 Jul. 2020. Each of the foregoing is incorporated by reference herein.

TECHNICAL FIELD

The subject invention relates to a membrane system utilized for the separation of fluid components, specifically spiral-wound membrane elements.

BACKGROUND ART

Spiral-wound membrane filtration elements are well known in the art, and typically comprise a laminated structure comprised of a membrane sheet sealed to or around a porous permeate carrier which creates a path for removal, longitudinally to the axis of the center tube, of the fluid passing through the membrane to a central tube, while this laminated structure is wrapped spirally around the central tube and spaced from itself with a porous feed spacer to allow axial flow of the fluid through the element. Traditionally, a mesh feed spacer is used to allow flow of the feed water, some portion of which will pass through the membrane, into the spiral wound element and allow reject water to exit the element in a direction parallel to the center tube and axial to the element construction.

Improvements to the design of spiral wound elements have been disclosed in U.S. Pat. No. 6,632,357 to Barger et al., U.S. Pat. No. 7,311,831 to Bradford et al., and patents in Australia (2014223490) and Japan (6499089) entitled "Improved Spiral Wound Element Construction" to Herrington et al. which replace the conventional feed spacer with islands or protrusions either deposited or embossed directly onto the inside or outside surface of the membrane. U.S. provisional application 62/797,357 to Herrington, et al, entitled "Integral Spacers" describes a method to make the membrane sheet that integrates the feed spacer components in the actual membrane sheet below the polymer layer, and also may incorporate at thick non-woven polyester support layer that is also thick enough to act as the permeate carrier. U.S. provisional application 62/849,952 to Beckman, et al, entitled "Entrance Features" describes features that minimizes fluid resistance by reducing stagnation points in the feed and reject regions of the spiral wound element. U.S. provisional application 62/855,166 to Herrington, et al, entitled "Variable Velocity Patterns" describes features in the feed space that maintains constant velocity of the fluid along the flow path from the feed to reject ends of a spiral wound element. U.S. provisional application 62/885,453 to Herrington, et al, entitled "UV Enhanced" describes methods to modify flux and rejection characteristics of polyamide membranes in spiral wound elements. PCT application US2018/55671 to Herrington, et al, entitled "Bridge Support and Reduced Feed Spacers" describes spacer features that support the end of the membrane envelop on rolling, and reduces feed spacer feature patterns in spiral wound elements. PCT application US2018/016318 to Roderick, et al, entitled "Graded Spacers" describes feed spacer features that decrease in height as they approach the center tube in longitudinal flow spiral wound elements in order to maintain constant velocity and reduce flow resistance in the feed flow path. PCT application US2017/52116 to Roderick, et al, entitled "Permeate Flow Patterns" describes flow channels in the permeate space of a spiral wound element, including printing feed spacer patterns on the permeate carrier that act as embossing points for the membrane sheet upon pressurization of the spiral wound element during initial startup. South Korean patent number 10-2033982 to Roderick et al, entitled "Interference Patterns" describes feed spacer features that eliminate nesting of feed spacer features upon rolling the spiral wound element during construction. PCT application US2018/27367 to Roderick et al entitled "Non Nesting Patterns" describes printed spacer patterns that avoid nesting of the feed spacer patterns during rolling and operation of a spiral wound element. PCT application US2018/28453 to Herrington et al entitled "Mixing Promoting Spacers" describes feed spacer features in the feed space channel of a spiral wound element in order to reduce concentration polarization and other deleterious effects. PCT application US2019/45222 to Weingardt, et al, entitled "Preferred Flow Paths" describes flow channels in the feed space of spiral wound elements. PCT application US2019/58652 to Roderick, et al, entitled "Flow Separators for RO Elements" describes various flow channel schemes in the feed space of spiral wound membrane elements. Each of the references cited in this paragraph is incorporated herein by reference.

Typically, fluid feed flow is normal to the center tube of the spiral wound element. In fabrication, after winding the element in the spiral configuration, the membrane sheet envelope is cut off after gluing and the feed edge of the membrane envelope presents a flat surface to the flow of feed solution. PCT application U.S. Ser. No. 17/624,25 entitled "Flow Directing Devices for Spiral Sound Elements" to Herrington, et al., describe anti-telescoping devices that incorporate turning vanes to cause fluid flow to sweep the feed end of the spiral wound element to help avoid blockage of particles in the feed stream from impinging on the end of the membrane envelope. PCT application U.S. 63/006,638 entitled "Independent Spacers" to Herrington, et al. describes spacing features that are fabricated separately and applied to the surface of the membrane sheet. Each of the references cited in this paragraph is incorporated herein by reference.

DISCLOSURE OF INVENTION

Understanding of the present invention can be facilitated by the context of U.S. Pat. No. 6,632,357 to Barger et al., U.S. Pat. No. 7,311,831 to Bradford et al., and patents in Australia (2014223490) and Japan (6499089) entitled "Improved Spiral Wound Element Construction" to Herrington et al., each of which is incorporated herein by reference.

Embodiments of the present invention provide feed inlet spacers, reject outlet support spacers, and, in some embodiments, internal support spacers that are not printed or embossed directly on the membrane surface, and are not integral to the permeate carrier. The support spacers are attached to the membrane surface prior to rolling into a spiral wound element, or applied in a flat plate configuration for application in electrodialysis or related type applications in a plate-and-frame system. The spacers can be applied on the upper surface of the leaf, or can be applied on the bottom leaf surface, or can be applied on both surfaces. Attachment can be achieved by adhesive applied to the support spacer or a portion of the support spacer, or the entirety or a portion of the support spacer can be glued to the membrane surface using adhesive similar to that used to seal the permeate carrier envelope, or can be glued with some other adhesive, such as epoxies, urethane adhesives, or other adhesives similar, or the same as, the adhesive used to seal the permeate carrier envelope. The spacer strips can be embossed to shape, can be injection molded prior to assembly, can be stencil cut, and can be in short or long segments. The support spacers can be dots, lines, line segments, curves, or other features that provide support to the glue line in the permeate carrier during spiral wound element rolling, and optionally internal to the spiral wound membrane element to support the middle of the spiral wound element to keep the membrane sheets separated, to provide turbulence in the flow path, or combinations thereof.

In one method of producing membrane sheets currently performed in the art, full sheets of membrane are printed, embossed, or patterns otherwise applied, typically to a full membrane sheet, which is for instance, 1 meter wide×2 meters in length, or other appropriate dimensions. This process leaves a significant open space in the middle of the membrane sheet that is not printed, but takes up space in the printing system and utilizes time to process the membrane sheet without significant material being applied to the membrane surface in the open areas, for instance the areas of the membranes sheet not near the feed or reject ends of the membrane.

Embodiments of the present invention allow the inlet and outlet feed and reject spacers to be printed on strips in a dense pattern on a large format photopolymer or offset, or screen printer, or other such system for applying material to a flat or curved material. The strips that have the feed, reject, or intermediate spacers applied can be aligned close to each other in the deposition process in order to maximize utilization of the printer, screen, offset, gravure, or other device or method for applying spacers to a substrate. The spacers on the substrate can then be cut in strips. The strips of spacers can then be applied to the surface of the membrane by an adhesive or bonding process without the need to print the complete membrane sheet surface. By applying adhesive to the spacer strips at the time of rolling, the adhesive can still be viscous and will allow slip of the spacer strip relative to the surface of the membrane sheet during rolling so that the spacer strip does not cause binding of the membrane sheet during rolling. Alternatively, the spacer strips can have adhesive applied and dried on the bottom of the spacer substrate prior to application and rolling of the spiral wound element module, or application in a plate-and-frame configuration. In addition, the substrates that the spacers are printed on can be cut in short segments with single or multiple spacer features on each substrate segment. A significant advantage of printing spacer features only on independent strips with patterns of spacer features is that the membrane sheet is not contacted in any manner by the printing process, which process can adversely affect the performance of the membrane sheet. Embodiments of the present invention avoid the addition of heat or wavelengths of energy to the membrane, or volatiles on the membrane sheet, by utilizing spacing features created on a separate substrate material which then facilitates attachment of the spacer features to the membrane sheet by any of a number of conventional attachment methods that do not have such negative effects on the performance of the membrane sheet.

The present invention contemplates a variety of methods for making independent spacers. As an example, a material such as a vinyl sheet can be obtained already attached to a first substrate via an adhesive that is bonded to the vinyl. When the first substrate is removed from the vinyl material, no adhesive remains on the substrate, but stays with the vinyl. The vinyl material can then be applied to a surface to cause the vinyl to stick to the surface. These techniques are used widely to adhere advertising to the side of vehicles. In addition, shapes, for instance lettering or logos, can be cut out of the vinyl without damaging the first substrate by the use of machines that cut through the vinyl, but do not have enough depth of cut to cut through the first substrate. The undesirable vinyl material, for instance, the undesired vinyl between the lettering or logos, can be weeded out of the pattern leaving only the lettering or logo on the first substrate. A second adhesive backed substrate, i.e., second substrate, can then be applied on top of the vinyl. This second substrate can have an adhesive on its surface that attaches more strongly to the top of the vinyl. The first substrate can then be removed from the vinyl leaving the vinyl attached to the second substrate. The vinyl with second substrate can then be applied to a surface, such as the side of a vehicle or window. The adhesive on the bottom surface of the vinyl has more adhesive strength to the intended surface than the second substrate to the vinyl. The second substrate can then be removed from the vinyl leaving the vinyl attached to the desired surface, for instance the side of a vehicle or glass surface. In similar fashion, vinyl patterns of specific shapes can also be applied to a membrane surface such as those membranes used in fluid separation, wherein the vinyl patterns are used as the spacer material in spiral wound elements as the feed spacer material, or in plate-and-frame configurations. Note that materials other than vinyl can be used, including such materials as PCV, CPVC, acrylic, ABS, polyethylene, polypropylene, polysulfone, polyesters, metallic materials, and others that are used in the art of spiral wound technology or plate-and-frame technologies.

In another example embodiment, a first substrate with a light adhesive coating can be used as the substrate to print or otherwise apply a vinyl, photopolymer coating, urethane coating, hot melt or other material directly to the adhesive-coated surface of the first substrate. Screen printing, graveur printing, ink jet, laserjet, and other techniques can also be used to apply a spacer material on the adhesive-coated surface of the first substrate. A second adhesive material can then be applied to the top of the material that was applied to the surface of the first substrate. The first substrate with the spacer material and adhesive applied to the top of the spacer material can then be applied to another surface such as a membrane sheet. The first substrate with its adhesive coating can then be removed leaving behind the spacer material which is now bonded to the membrane surface. The spacer material can now be applied adhesively to the membrane surface, and the top of the spacer material will be free of adhesive material. The membrane sheet, with the spacers now applied, can be rolled into a spiral wound membrane element, or can be used in a plate-and-frame type membrane application or other type of membrane separation process where membrane sheets are spaced apart from each other so fluid or gas can reach the membrane surfaces.

To support high speed automation, and in order to speed up the weeding process of unwanted vinyl, the patterns can be designed such that all "negative" space can be removed as a single piece. To do this, that pattern can be designed in such a way that the spacer pieces left behind after weeding are individual elements and the weeded-out portion is entirely interconnected.

During development and testing associated with the present invention, it was found that spacer stickers can be weeded much more easily if there is a larger section of spacer at the head of the section to be left after weeding. This larger section increases the bond strength between the spacer and the backing and makes it less likely to be removed with the negative space as the negative space is weeded out.

In addition to making the heads of the spacer features larger in order to increase bond strength to the backing paper, the heads can also have rounded edges or a double headed arrow-like shape which tapers to a point at the end and also tapers back to the width of the spacer bar at the opposite end of the head. This tapered shape reduces the area over which pulling force is applied when weeding, and makes it easier to remove the negative space without removing the spacer feature from the backing.

When designing the larger heads for increased weedability it is desired to make the heads as large as possible, but it was also found that the space between the heads must be sufficiently wide that the material does not break when it is pulled during the weeding process. The width of the negative space between spacer heads can be at least 0.015" and the space can increase as material thickness increases, or can be smaller spacing if the material to be weeded has higher strength.

In order to increase productivity by reducing the number of times a spacer must be weeded, the length of the spacers can be made 2-3 times longer than the standard spacer length and cut to width in strips after weeding. This reduces labor as the most time-consuming part of weeding is initiating the process. Reducing the number of times weeding must be initiated reduces the overall labor time per spacer strip and increases productivity.

When weeding out the undesired material it can be advantageous to weed out normal to the direction of the spacer features. To facilitate weeding in a direction 90 degrees from the normal orientation of the spacer segment directions, for example weeding 90 degrees from the direction of feed flow into the spiral wound element, or in the fluid path in a plate-and-frame application, it can be advantageous to orient the spacer directions at an angle that is not normal to the flow, i.e. not normal to the center line of the center tube of the spiral wound element. In this manner, the lead part of the undesired material is removed from the spacers first, and is followed by removing the undesirable material down the length of the spacer elements.

When automating the weeding process, a spool or take-up reel can be used to accumulate the unwanted material from the weeding process. This take-up reel can be oriented at an angle offset from the line of spacer strips. This will allow weeded material to come up from the spacers at an angle which can facilitate removal of the weeded material from the spacer strips rather than trying to remove the weeded material perpendicular or parallel to the spacer strips.

MODES FOR CARRYING OUT THE INVENTION AND INDUSTRIAL APPLICABILITY

Figure 1:
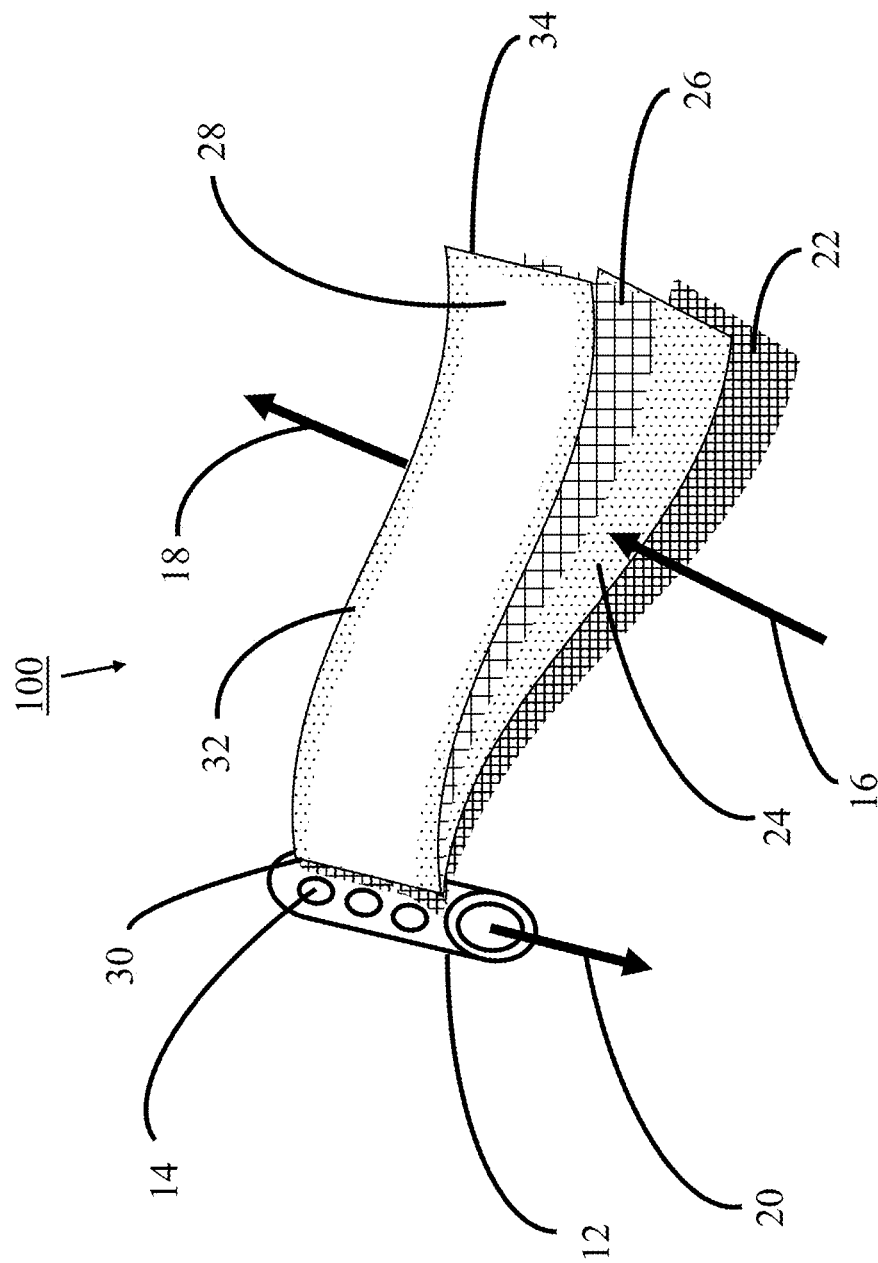
FIG. 1 is a view of a conventional spiral wound membrane element prior to rolling.

FIG. 1 illustrates significant elements of a conventional spiral wound membrane element 100.

Permeate collection tube 12 has holes 14 in therein where permeate fluid is collected from permeate feed spacer 22. In fabrication, membrane sheet 24 and 28 comprises one sheet that is folded at center line 30. Membrane sheets 24 and 28 are typically comprised of a porous non-woven polyester layer, a porous support layer, for example polysulfone, and an active polymer membrane layer bonded or cast on to the support layer. Active polymer membrane surface 24 is adjacent to feed spacer mesh 26 and non-active support layer 28 is adjacent to permeate carrier 22. Feed solution 16 enters between active polymer membrane surfaces 24 and flows through the open spaces in feed spacer mesh 26. As feed solution 16 flows through feed spacer mesh 26, total dissolved solids (TDS) ions are rejected at active polymer membrane surfaces 24 and molecules of permeate fluid, for instance water molecules, pass through active polymer membrane surfaces 24 and enter porous permeate carrier 22.

As feed solution 16 passes along active polymer membrane surface 24, the concentration of TDS ions increases due to the loss of permeate fluid in bulk feed solution 16, and thereby exits the reject end of active polymer membrane sheet 24 as reject solution 18. Permeate fluid in permeate carrier 22 flows from distal end 34 of permeate carrier 22 in the direction of center tube 12 where the permeate fluid enters center tube 12 through center tube entrance holes 14 and exits center tube 12 as permeate solution 20. To avoid contamination of the permeate fluid with feed solution 16, active polymer membrane surfaces 24 are sealed with adhesive along adhesive line 32 through permeate carrier 22 thereby creating a sealed membrane envelope where the only exit path for permeate solution 20 is through center tube 12.

Figure 2:
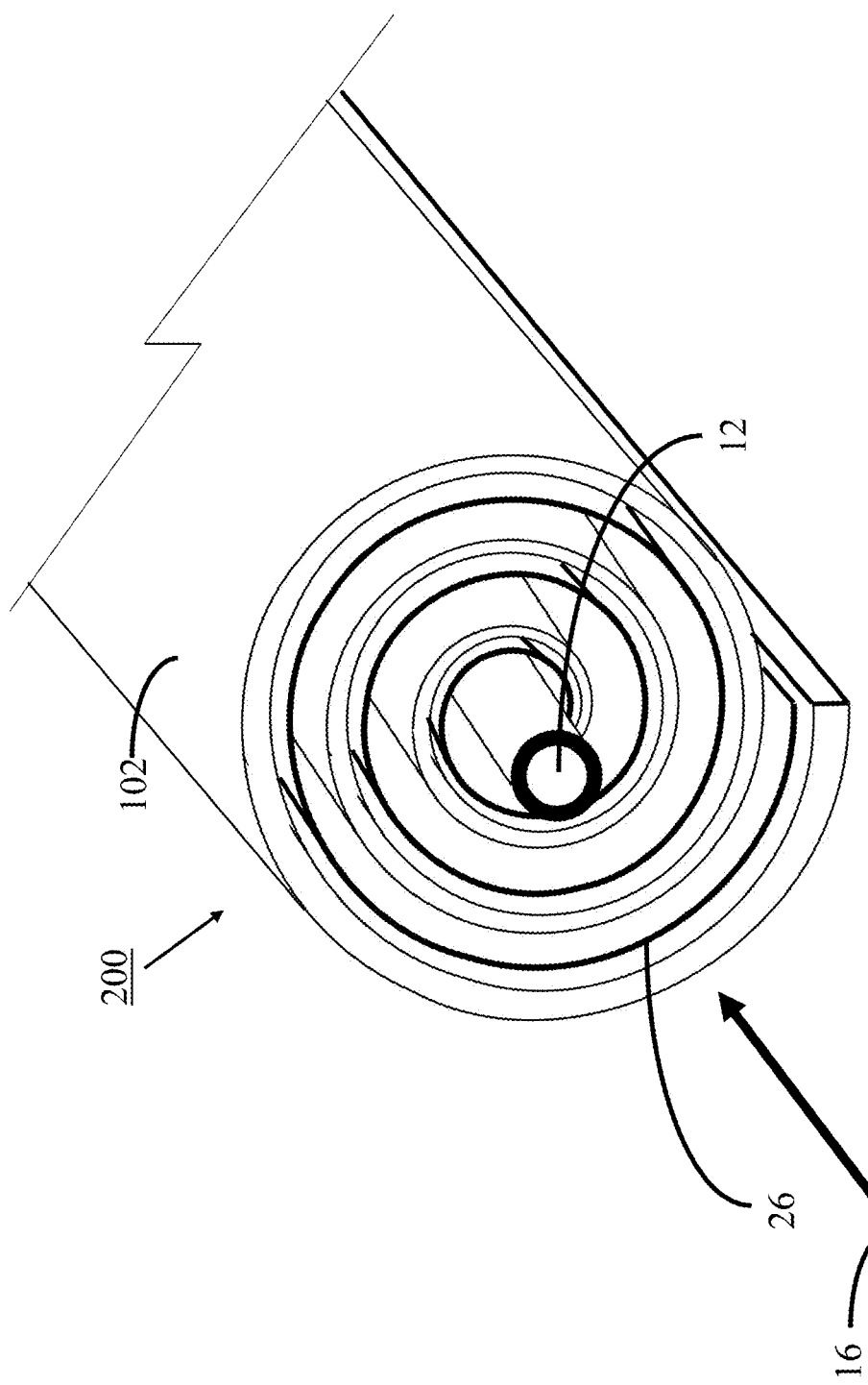
FIG. 2 is an end view of a spiral wound membrane element.

An assembled spiral wound membrane element 200 as shown in FIG. 2 comprises a membrane envelope 102 of a membrane sheet folded at one end with a permeate carrier disposed between the membrane sheets and sealed along the edges with a suitable adhesive. In the conventional design of membrane element 200, a feed spacer mesh 26 is placed adjacent to envelope 102 to allow the flow of feed fluid 16 to flow in the feed space of membrane envelop 102 and expose all of the active polymer surfaces of the membrane sheet to feed fluid 16. Permeate, or product fluid is collected in the permeate carrier inside membrane envelope 102 and proceeds spirally down to center tube 12 where the product, or permeate fluid is collected.

Figure 3:
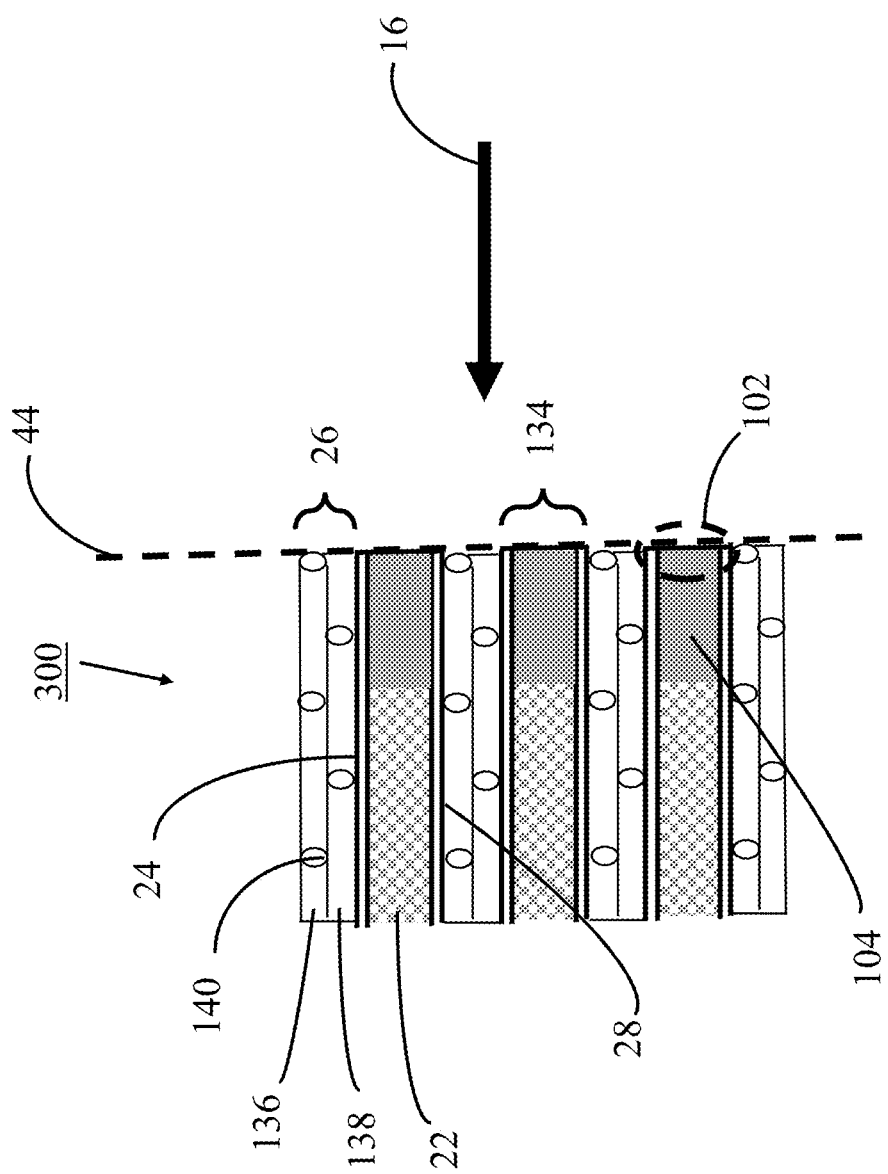
FIG. 3 is a cross section view of a conventional mesh type membrane element.

Referring to FIG. 3, a sectional view of a portion of such an element, the membrane envelope is created by sealing edges of a first 24 membrane sheet, a layer of permeate carrier 22, and a second 28 membrane sheet together with an adhesive 104. In the process of fabrication of a spiral wound element, the individual membrane leaves 24 and 28 are folded in half and permeate carrier 22 is placed between each folded sheet and the adhesive is applied on top of the permeate carrier and the element is rolled to produce the layered spiral configuration. During the rolling process, adhesive 104 must penetrate through permeate carrier 22 in order to properly seal membrane sheets 24 and 28 together to create membrane envelope 102 as in FIG. 2. Again referring to FIG. 3, to complete final construction of membrane element 200 (FIG. 2), the ends are trimmed through adhesive material 104 along cut line 44. In many fluid feed applications, feed fluid 16 might contain particles or impurities that might impinge on the flat end edges 134 of envelope 102, allowing particles to collect on the end faces of envelope 102 and consequently restricting fluid flow into the feed spaces between the leaves of envelope 102. In addition, feed spacer mesh 26 can typically comprise a plastic webbing type mesh; the cut ends of the mesh can also act to accumulate particles in the entrance area of feed spaces between envelope 102. Feed spacer mesh 26 comprises upper strands 136 and lower strands 138 that are bonded together at contact points 140. Another undesirable characteristic of the existing mesh type spacer membrane elements is that feed fluid 16 has to flow over and under strands 136 and 138 which creates pressure losses in the mesh spacer. These pressure losses increase the energy costs of operation of membrane systems. If pressure losses can be decreased, the overall energy requirements for the system can be reduced. In typical construction of a conventional membrane element 200, membrane sheets 24 and 28 enclose permeate carrier 22 extending to the edge of the membrane sheets that allows the flow of permeate to the center collection tube 12 (FIG. 2).

From a fluid dynamic standpoint, feed fluid 16 impinging on flat end faces 134 of membrane envelope 102 is not optimal, and creates additional resistance to fluid flow as the fluid transitions from bulk flow into the feed channels. In an alternative embodiment of the spiral wound membrane system, feed spacer mesh 26 can be replaced with individual spacer features applied directly to membrane sheet 24 thereby eliminating the need for feed spacer mesh 26. These individual spacer elements can be applied directly to membrane sheet 24 or can be applied directly to a substrate material that can then be transferred to membrane sheet 24.

Alternative embodiments of spacing features attached to a substrate are referenced in U.S. provisional patent application No. 63/006,638 entitled "Independent Spacers" to Herrington, et al., which is incorporated herein by reference.

Figure 4:
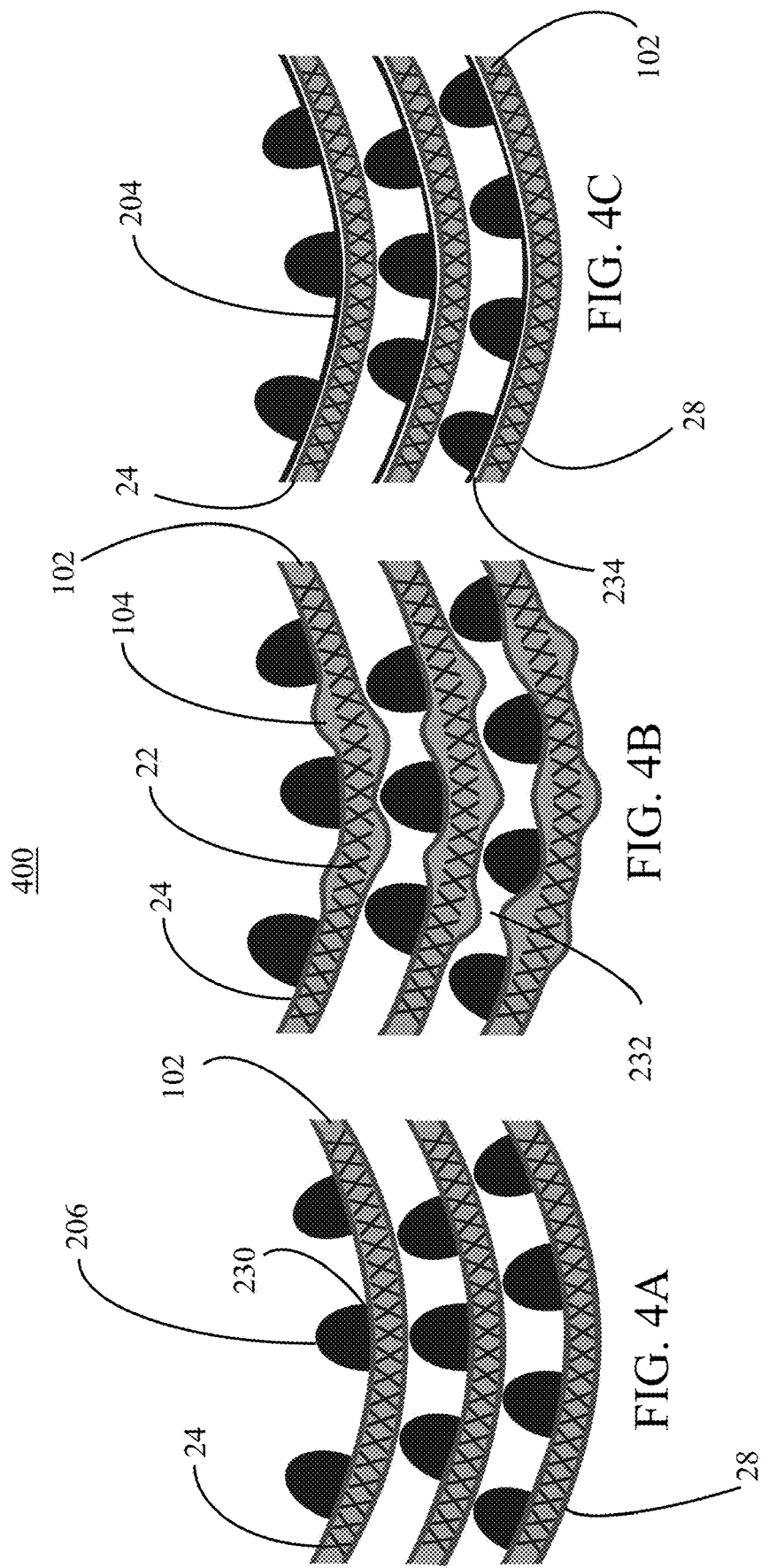
FIG. 4 are 3 views of the entrance or reject end of a spiral wound membrane element with feed spacers.

In an example embodiment of the membrane element shown in FIG. 4A, spacing features 206 are attached individually to membrane envelope 102, or prior to creating membrane envelope 102 by applying spacing features 206 directly on membrane surface 24, or alternately on membrane surface 28, or both membrane surfaces 24 and 28. In this embodiment, spacing features 206 are attached to the membrane surface by any appropriate adhesive 230 that can be applied on the attaching surface of spacing features 206, or alternately directly on membrane surface 24 or 28, or on membrane envelope 102.

In reference to FIG. 4B, membrane envelope 102 is created by the addition of adhesive 104 to seal permeate carrier 22 to membranes surfaces 24 and 28 to create membrane envelope 102. In some instances with printed spacers 206 there might be inadequate support of membrane surfaces 24 and 28 which allows adhesive 104 to cause bulging of membrane surfaces 24 and 28 during the spiral element rolling process. This results in partial blockage of feed solution 16 (FIG. 2) from entering feed space 232. Referring to FIG. 4C, to help mitigate this problem, adhesive backed or printed spacers 206 applied to substrates 204 are made from materials that can be stiffer than membrane sheets 24 or 28, and can therefor provide more support for adhesive 104 from bulging and blocking off inlet feed space 232. This can result in less fluid pressure loss across the feed and exit areas of the feed space in the spiral wound element, and therefore reduce overall operating energy costs.

Figure 5:
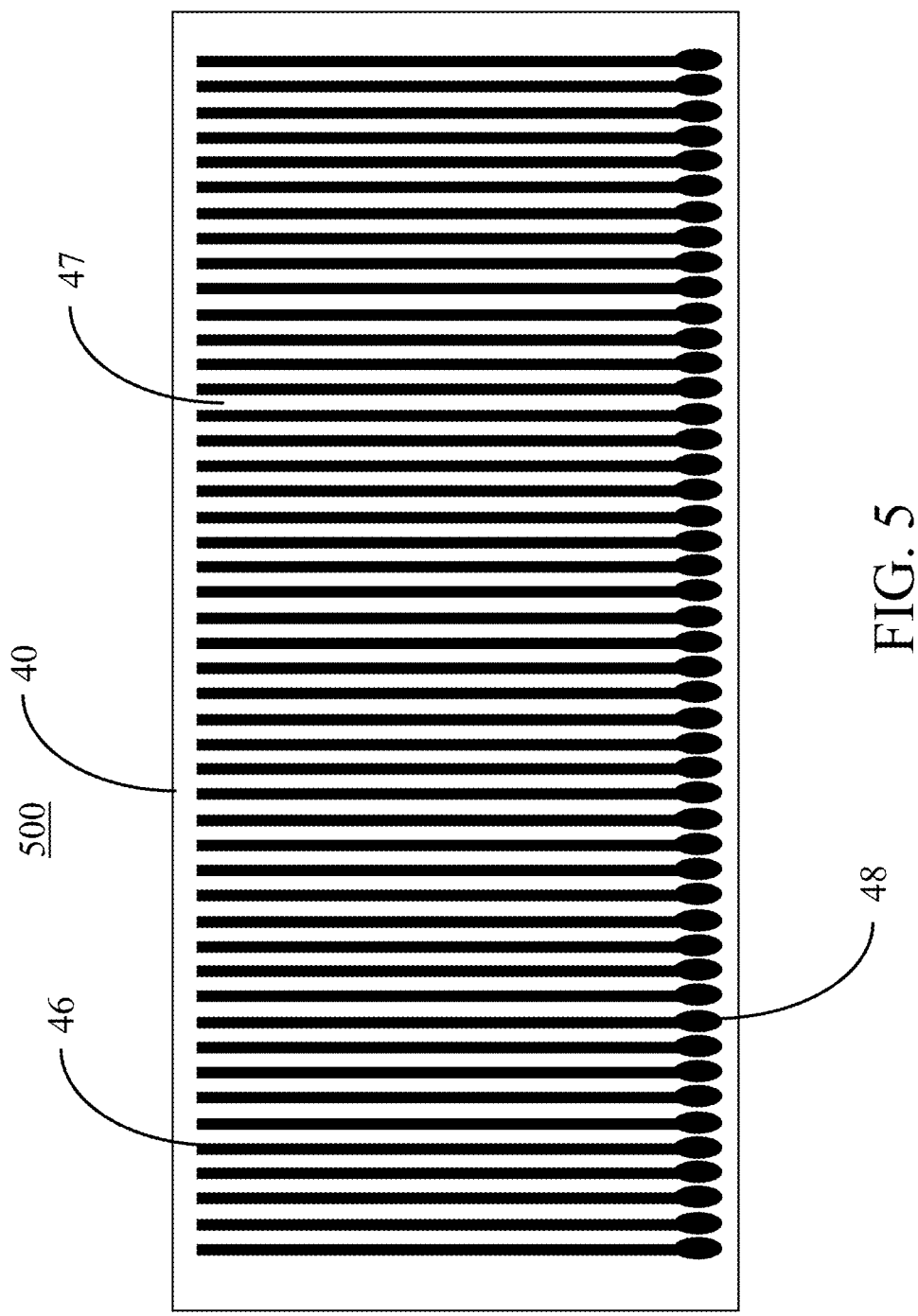
FIG. 5 is a view of spacers on a substrate with features to facilitate removal of unwanted interstitial material.

FIG. 5 shows an assembly 500 comprising spacer features 46 applied to substrate 40 wherein spacer features 46 can, but are not required to, incorporate weeding heads 48 that facilitate removal of unwanted spacer material from substrate 40. In one process in the example embodiment, a vinyl or other material covers the complete surface of substrate 40 and a cutting machine is programmed to cut through the vinyl material to cut the outlines of spacers 46 but not cut into substrate 40. Note that spacers 46 will be comprised of the vinyl material. In the example embodiment, unwanted material 47 is removed from substrate 40 leaving behind only spacers 46. To facilitate removal of unwanted material 47 from substrate 40 without disturbing individual spacers 46, special features such as weeding heads 48 can be incorporated in the cutting pattern for spacer features 46. In some example embodiments, the overlying material on substrate 40 can be any type of appropriate material including PVC, CPVC, polyester, polycarbonate, ABS, or any number of other plastics, polymers, or even metals or alloys.

Figure 6:
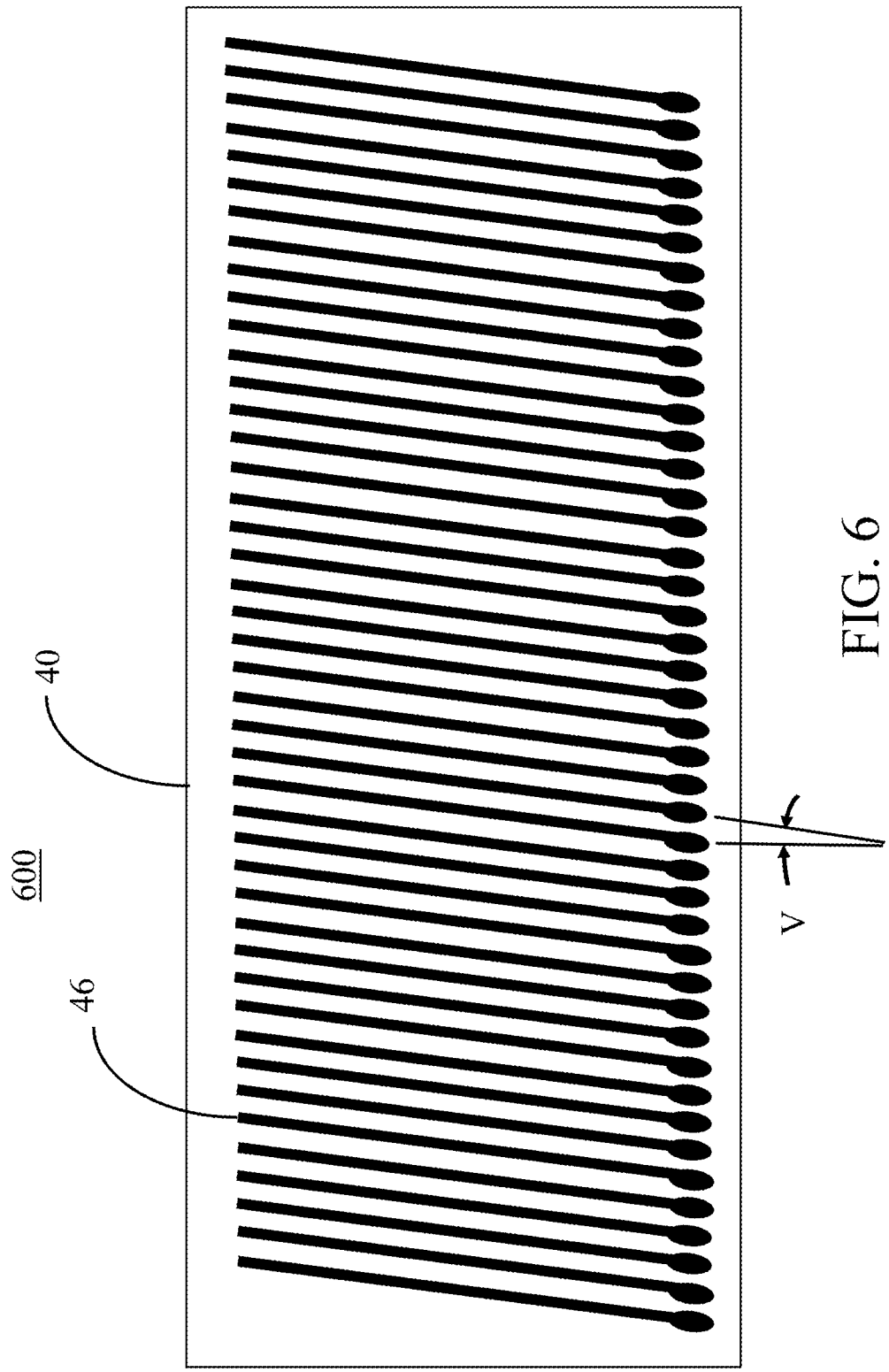
FIG. 6 is a view of spacers on a substrate with features to facilitate removal of unwanted interstitial material, and oriented at an angle to the direction of the substrate.
Figure 7:
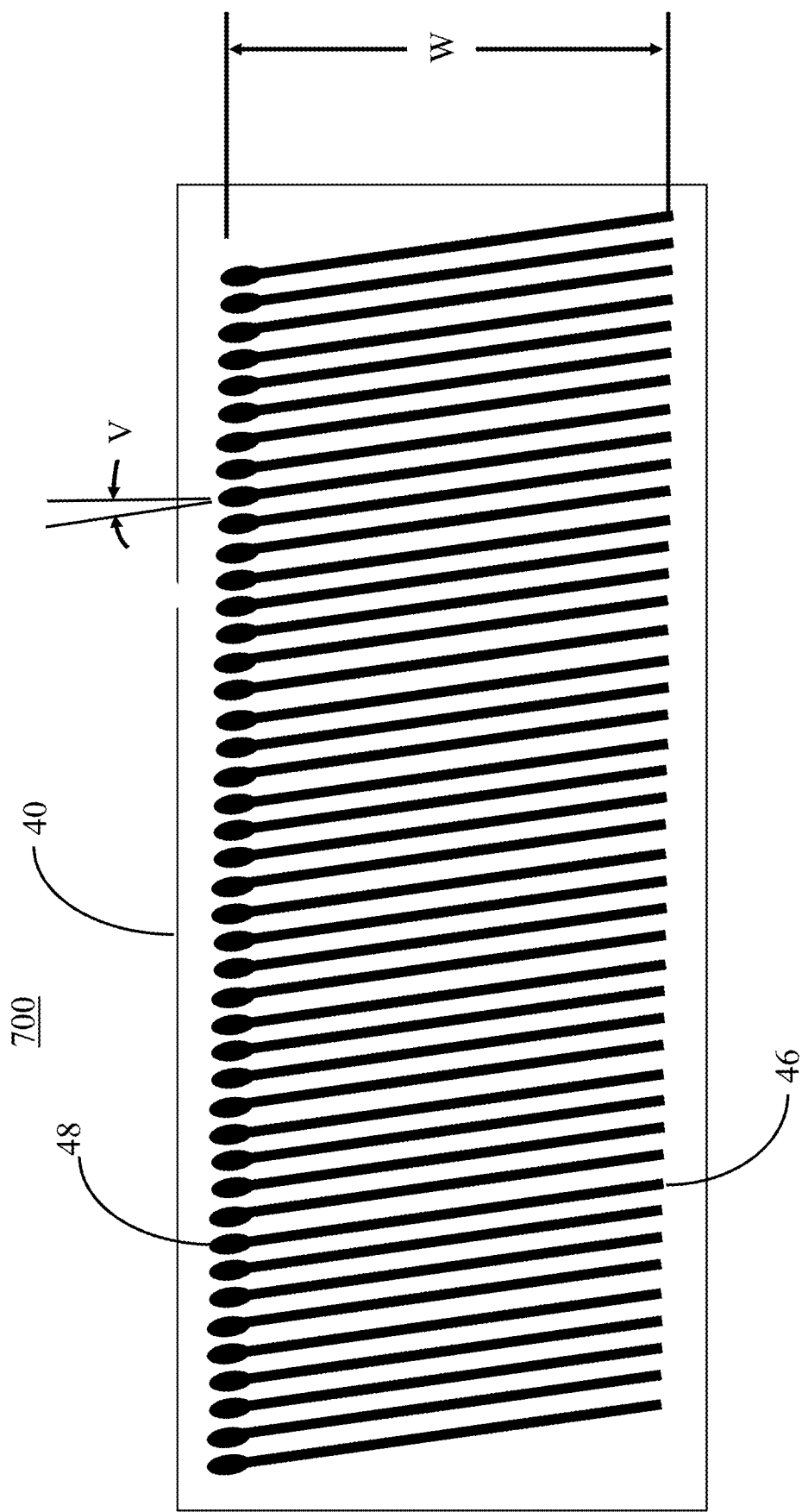
FIG. 7 is a view of spacers on a substrate with features to facilitate removal of unwanted interstitial material, and oriented at an angle other than 90 degrees to the direction of the substrate.

Referring to FIG. 6, the alignment of spacers 46 can be oriented at a nonzero angle "V" relative to normal to the direction of substrate 40. Angle V can be positive or negative as shown in FIGS. 6 and 7. FIG. 7 also shows an embodiment where weeding heads 48 are oriented at the opposite end of spacers 46 from those shown in FIG. 6. During assembly of spiral wound element 200 (FIG. 2), weeding heads 48 can be cut off at cut line 44 (FIG. 3) of both the feed and reject ends of envelope 102 (FIG. 2) after initial winding of element 200. This process leaves only spacers 46 on the active surface of membrane surface 24, and alternatively also on active surface of membrane 28 (FIG. 1). By removing weeding heads 48 during the assembly process, there is less resistance of feed fluid 16 from entering the feed space of the spiral wound element.

Figure 8:
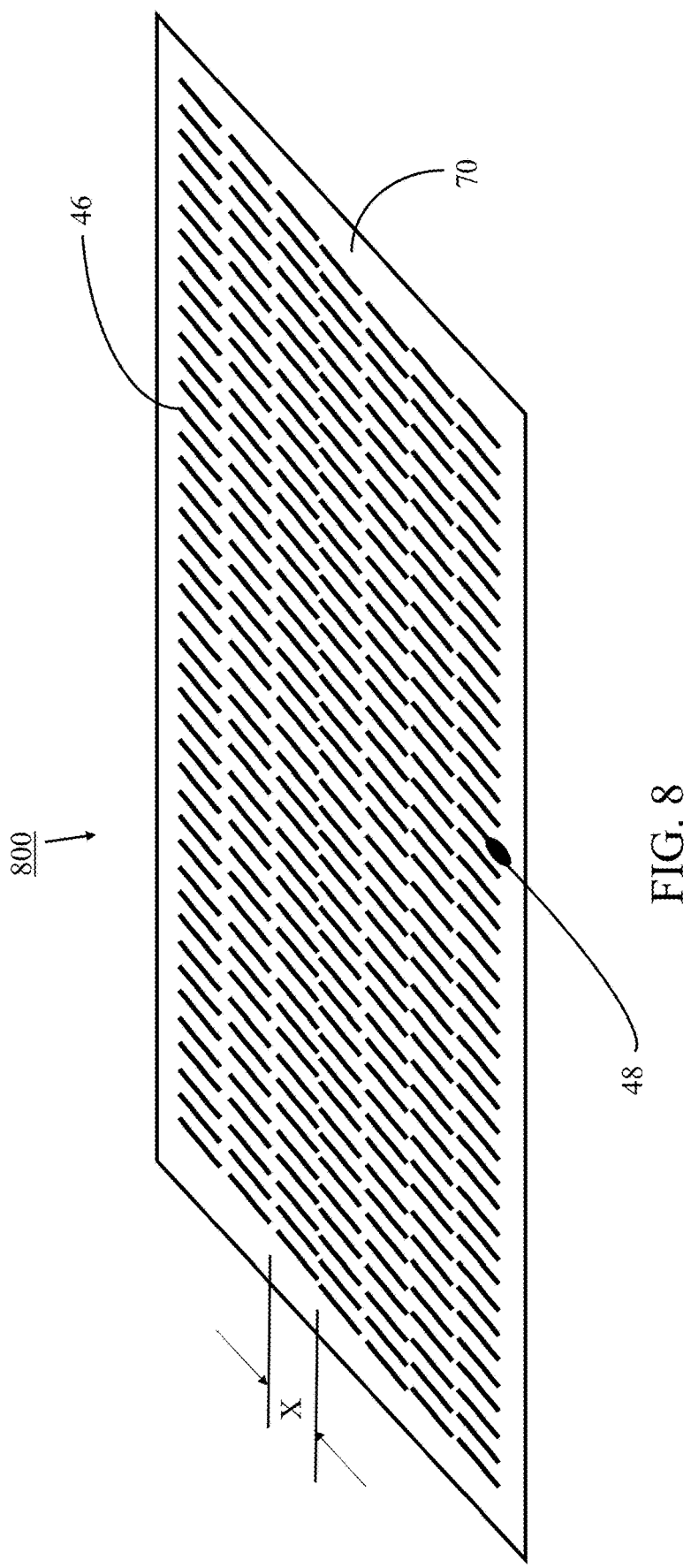
FIG. 8 is a view of a substrate sheet with individual spacer features deposited on the substrate.

In the prior art, spacers are otherwise printed on or applied directly to the surface of membrane sheet 24. For optimal design of spacers 46 on a membrane sheet for spiral wound element construction, spacers 46 are located on membrane sheet at various locations to either support glue lines, or to ensure proper spacing of membrane sheets 24 subsequent to rolling in a spiral wound configuration. Direct printing or application on the membrane sheet necessarily creates significant open space on membrane sheet 24. As shown in FIG. 8, printing or deposition of spacers 46 can be accomplished in a dense pattern that allows maximum utilization of spacers 46 on film 70. This process ensures maximum utilization of available space on film 70 and also ensures maximum speed of deposition of material on film 70 and thereby increases the rate of production of spacers 46. Spacers 46 can be fabricated in any length X on film 70 or the value of X can be variable from one spacer length to another on the same sheet of film 70. Spacers 46 optionally incorporate weeding heads 48 into the design of spacers 46. Weeding heads 48 can be particularly appropriate for the application where a spacer pattern is cut into a substrate as shown in FIG. 8.

Figure 9:
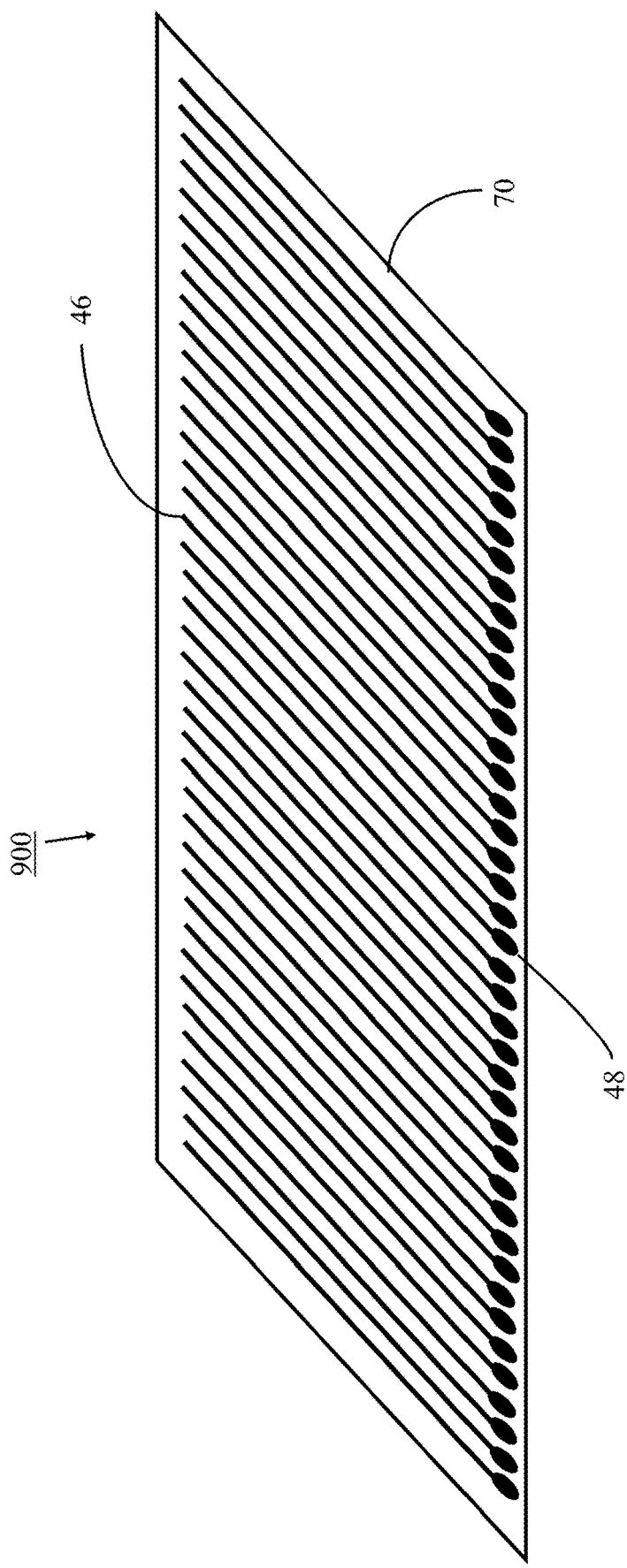
FIG. 9 is a view of a substrate sheet with continuous spacer features deposited on the substrate.
Figure 10:
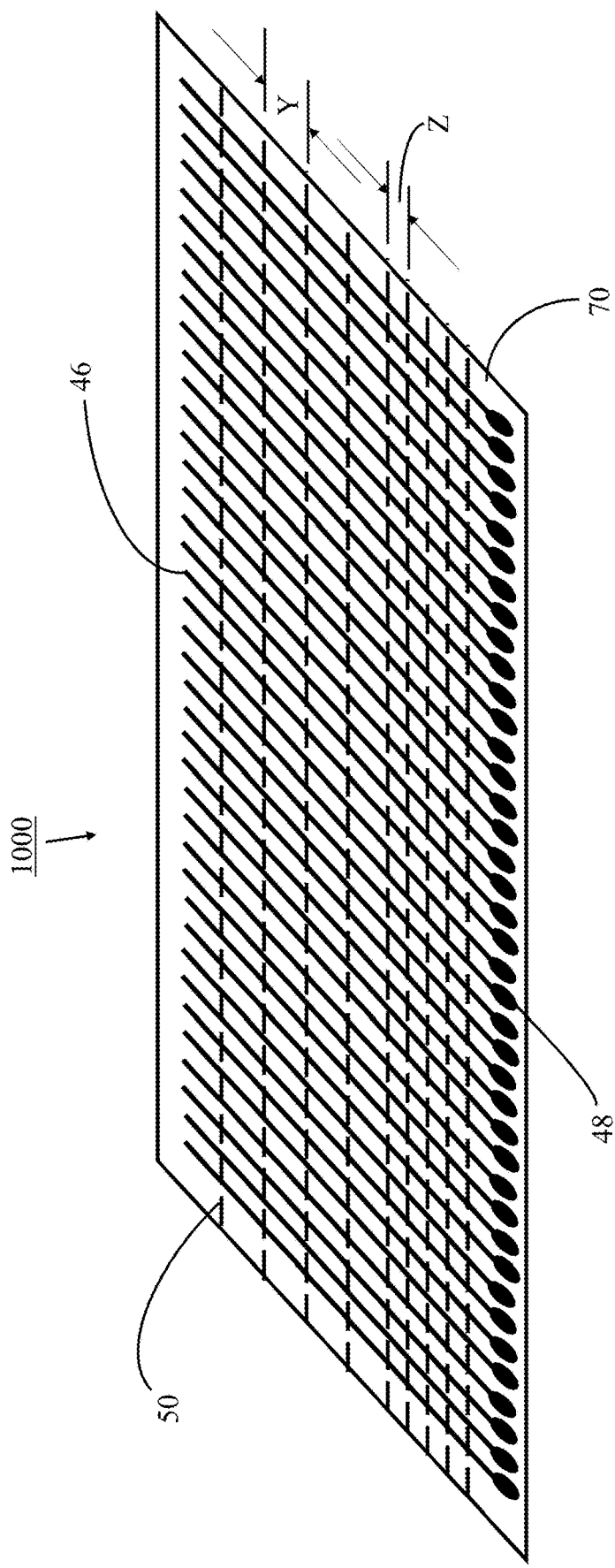
FIG. 10 is a view of a substrate sheet with continuous spacer features deposited on the substrate, and cut into various length spacer segments.

As shown in FIG. 9, spacers 46 can be created to the full length/width of film 70. Weeding heads 48 can optionally be utilized. As indicated earlier, weeding heads 48 can be particularly appropriate for the application where a spacer pattern is cut into a substrate as shown in FIG. 9. By creating spacers 46 the full length of film 70, maximum utilization of material can be achieved in the fabrication process. Subsequently, as shown in FIG. 10, spacers 46 can be cut to any number of lengths Y and Z, or random lengths, as desired to optimize the design of the pattern to be utilized for spacers 46 on membrane sheet 24 prior to rolling the membrane sheet into a spiral wound element configuration.

Figure 11:
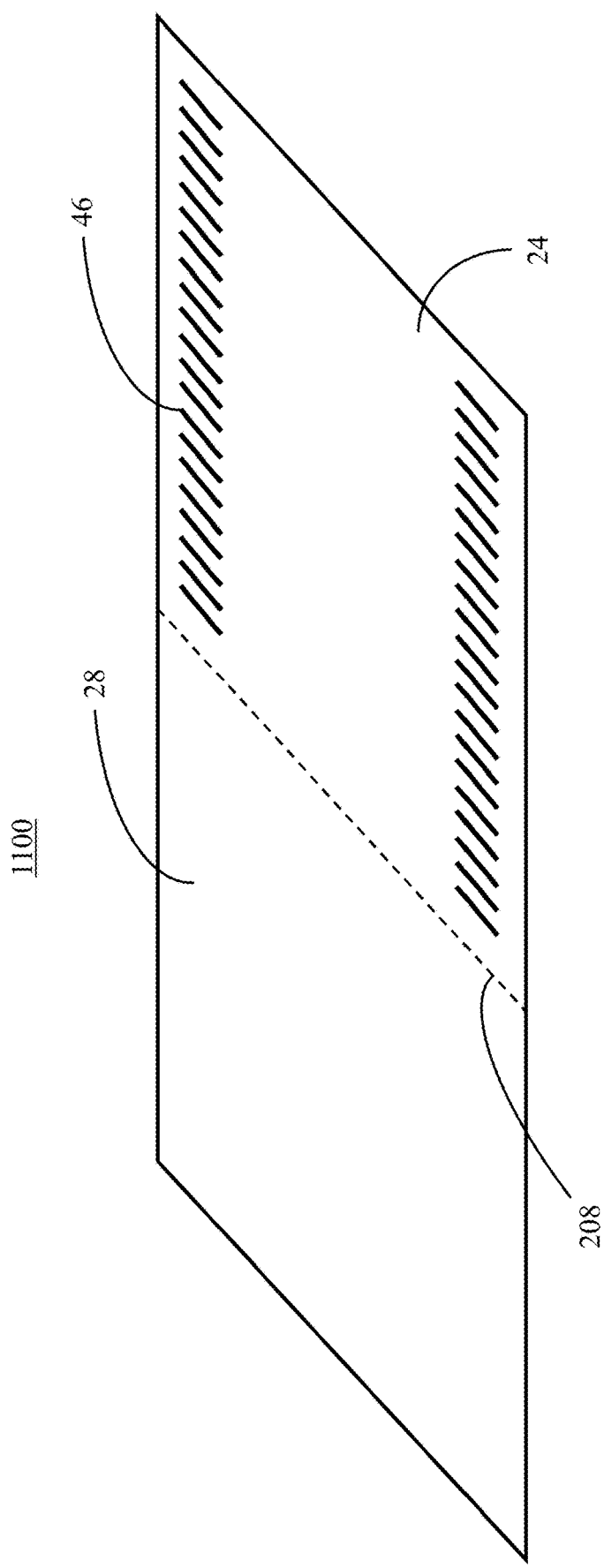
FIG. 11 is a view of spacer features applied to the inlet and outlet feed portions of a membrane sheet.

FIG. 11 shows spacers 46 applied to membrane sheet 24. Prior art discusses the process of utilizing spacers in the appropriate locations on a membrane sheet. A full membrane sheet can be, for instance, one meter wide and two meters long. One half of a membrane sheet might have no spacers applied, e.g., membrane sheet area 28. Spacers 46 might only be applied on membrane sheet area 24. Applying spacers 46 on only one half of a membrane sheet and folding the membrane sheet at fold line 208 will avoid interference of spacers 46 when the membrane sheet is rolled into spiral wound configuration 102 (FIG. 2). In alternative embodiments discussed in the prior art, feed end and exit end spacers can be applied along the entire length of the membrane sheet.

Figure 12:
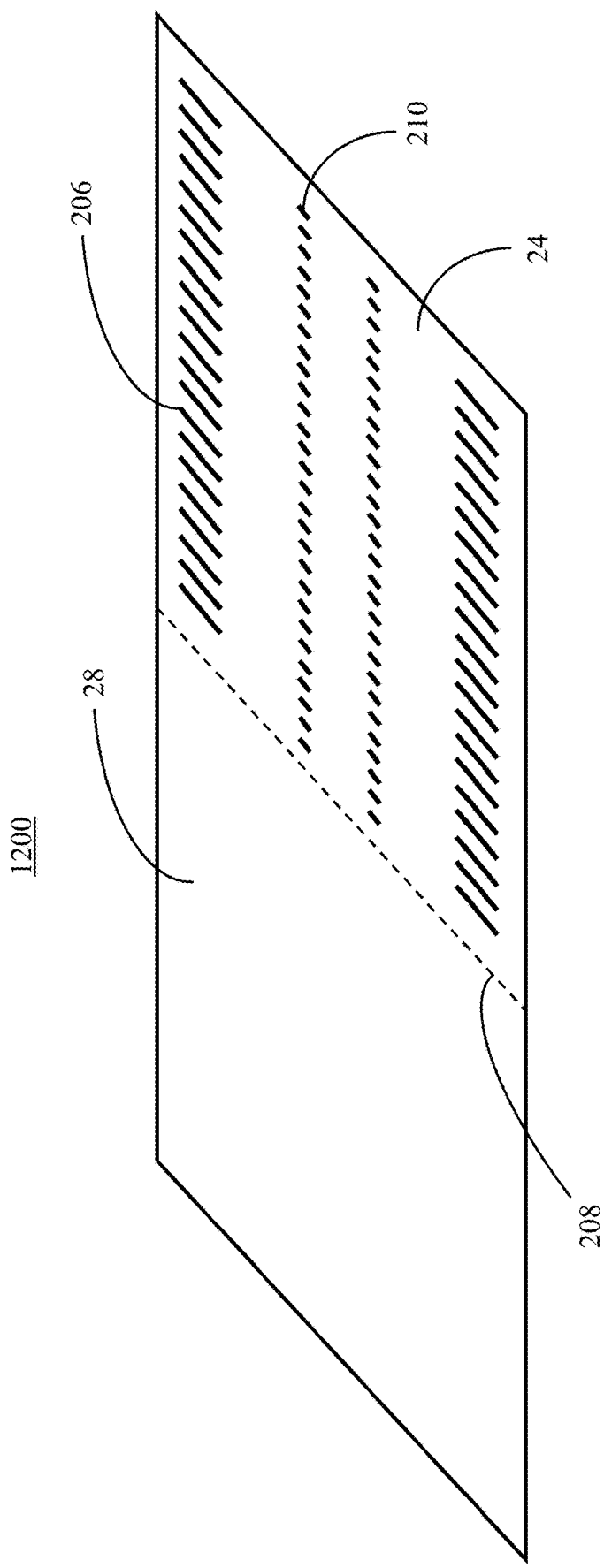
FIG. 12 is a view of spacer features applied to the inlet and outlet feed ports of a membrane sheet as well as spacer features applied in the non-edge areas of a membrane sheet.

FIG. 12 shows membrane sheet 24 with spacers 206 applied on the feed and reject ends of membrane sheet 24, as well as intermediate spacers 210 applied in the middle spaces of membrane sheet 24 to provide spacing support in the middle areas of membrane sheet 24. Any number of rows of spacers 210 can be applied to membrane sheet 24.

Figure 13:
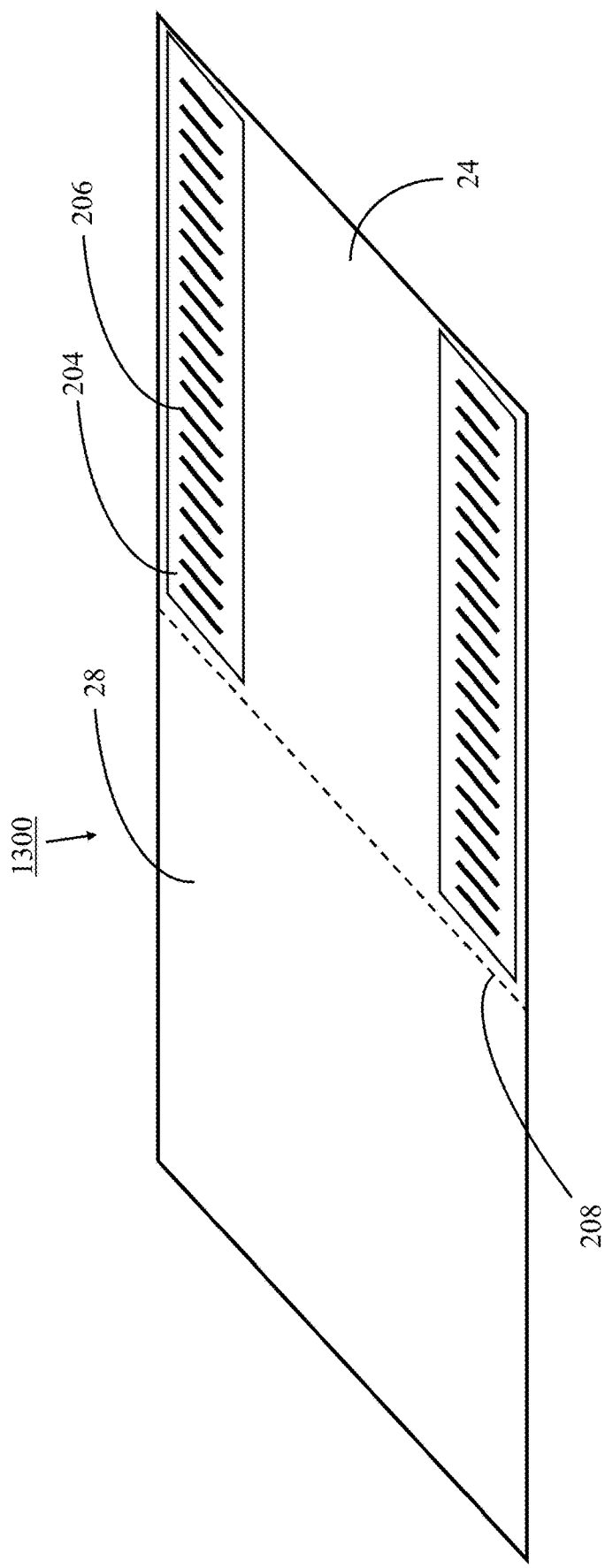
FIG. 13 is a section view of a membrane sheet with feed spacers attached to a strip that is at the feed and entrance ends of the membrane sheet.

Referring to FIG. 13, spacers 206 that are attached to substrates 204 can be attached to membrane surface 24, or in some configurations, either attached to membrane surface 28, or to both membrane surfaces 24 and 28 using an appropriate adhesive 234 (FIG. 4C). Spacers that are independent of a substrate can be stencil cut, or otherwise molded in any number or manufacturing methods known in the art. Adhesive 234 can be applied to the bottom surface of substrate 204 so that substrate 204 self-adheres to membrane surface 24 or 28. Prior to the rolling process, membrane sheets 24 and 28 can be folded over on each other at fold line 208. During rolling of the spiral wound element 200 the difference in winding radius of membrane surface 24 or 28 with respect to substrate 204 can cause mechanical interference between membrane surfaces 24 or 28 and substrate 204. This can cause gaps to occur between membrane surfaces 24 and 28 with respect to substrate 204, thereby causing stress and discontinuities between the two surfaces, and can cause stress in membrane surfaces 24, 28, or both, which can damage the membrane surfaces and reduce rejection of ions from the membrane surface. Another option for adhesion of substrate 204 is application of thixotropic adhesive such as urethane adhesives that do not dry quickly, but allow slippage of substrate 204 against membrane surfaces 24 or 28 during the rolling process. This is the same process that is used to bond membrane sheets 24 and 28 together with permeate carrier 22 during the spiral element rolling process.

Figure 14:
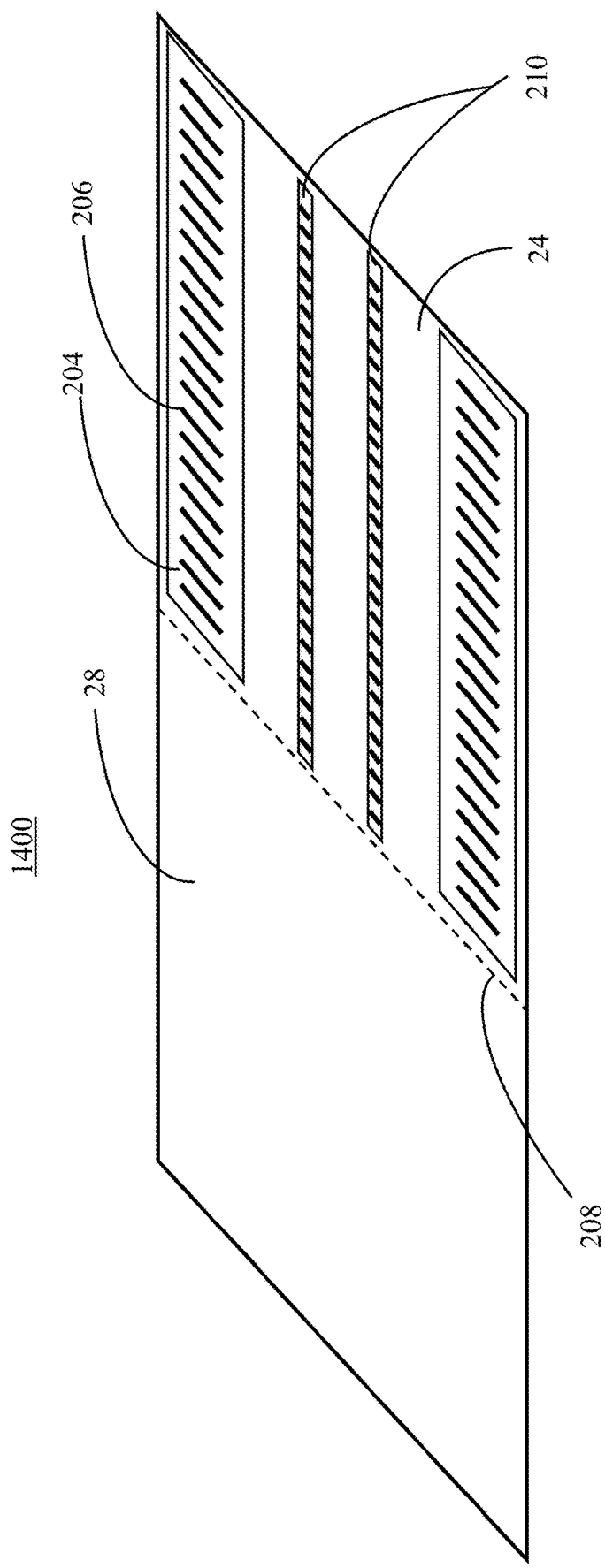
FIG. 14 is a section view of a membrane sheet with feed spacers attached to a strip that is at the feed and entrance ends of the membrane sheet as well as in the internal areas of the membrane sheet.

In reference to FIG. 14, longer length elements, e.g., spiral wound elements of 12 inches or longer, may need additional support between the feed and reject ends of the feed space in the spiral wound element in order to keep the feed spaces open between the feed and reject ends of the spiral wound element. To accomplish this additional support, and to mitigate the need to process membranes 24 and 28 via thermal or radiation processes which can damage the characteristics of membrane sheets 24 and 28, spacer strips 210 (FIG. 12) can be attached to membrane sheets 24, 28, or both, in one or more locations across the membrane surfaces to provide intermediate support. The patterns on spacer strips 210 can comprise dots, dashes, straight lines, curved lines, or other special shapes to help maintain localized vorticity and minimize concentration polarization—the accumulation of ions at the membrane surface that locally increases the osmotic pressure at the membrane surface.

Figure 15:
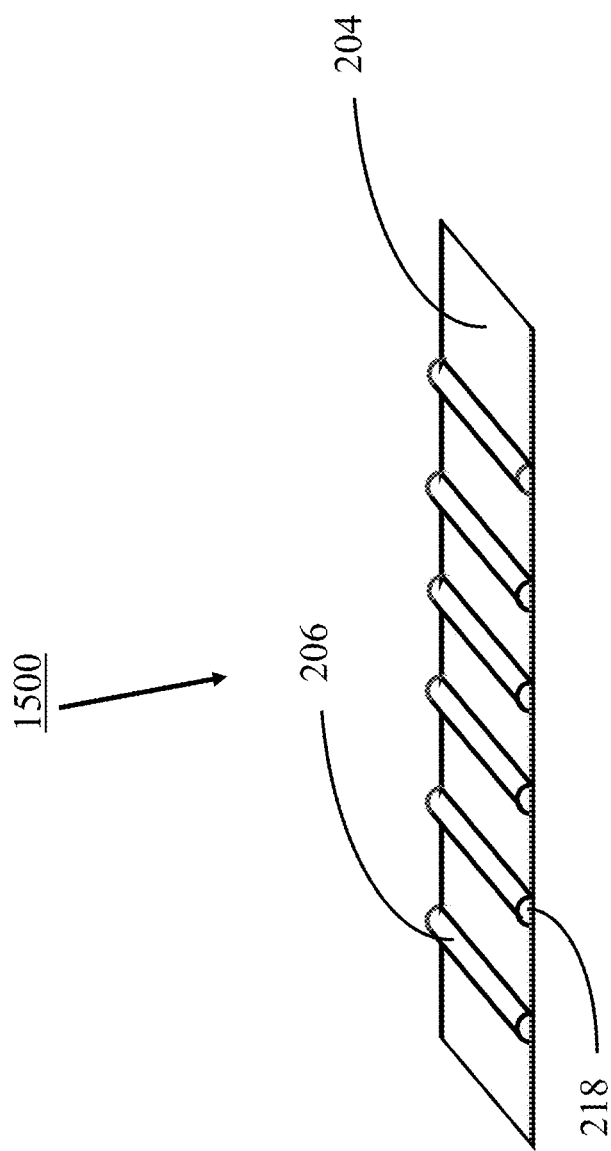
FIG. 15 is a view of a spacer strip with a continuous bottom surface and features on top of the strip.
Figure 16:
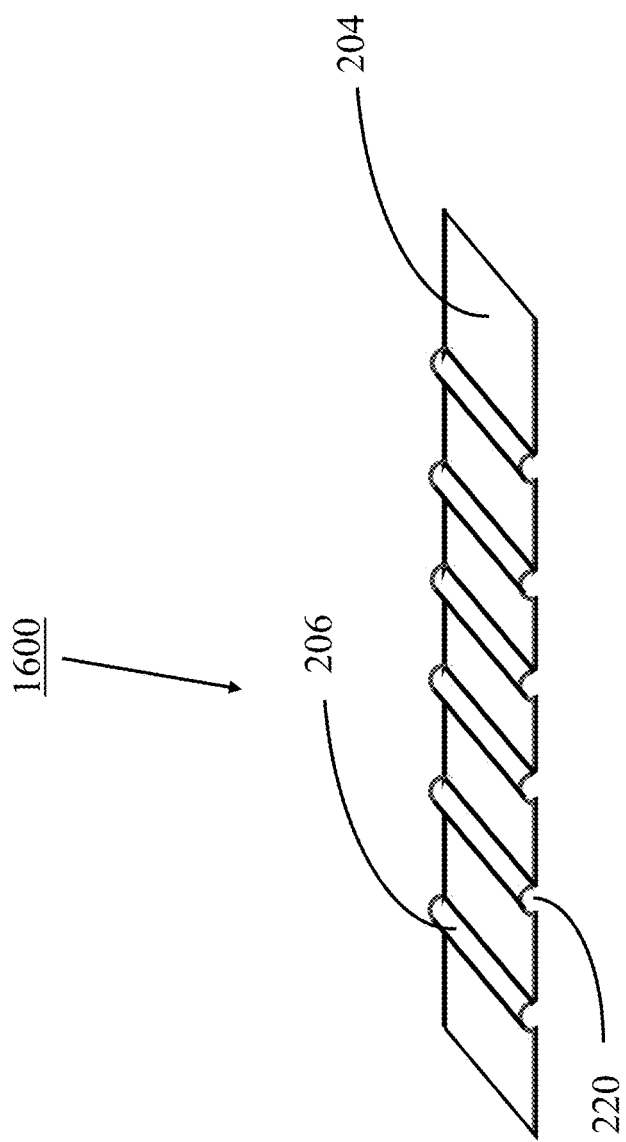
FIG. 16 is a view of a spacer strip with features that are integral to the strip without a continuous bottom surface.

Feed or reject support substrates 204 can be manufactured by any number of methods as shown in FIG. 15. This includes injection molded substrates with integral solid spacers 206, substrates that are compression molded, or any other method that is used to manufacture three dimensional materials. FIG. 16 shows a spacer 206 integral to substrate 204 that has open channels 220 that can help in fluid flow through feed spacers 206 in some applications. These substrates 204 can be manufactured by any of the known methods of manufacturing materials of this nature including injection molding, casting, compression molded, embossing, or other such techniques.

Figure 17:
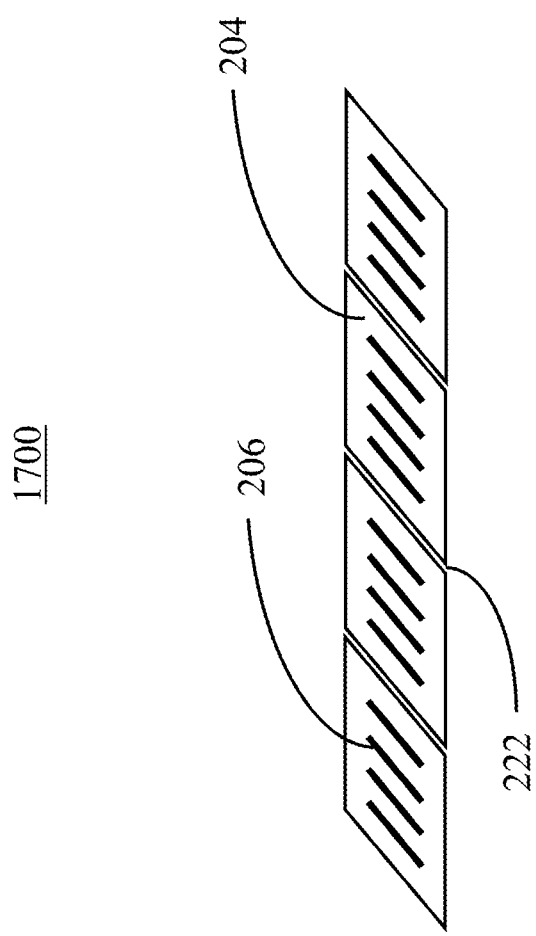
FIG. 17 is a view of a spacer strip that is made in multiple segments.

FIG. 17 further describes spacer 206 substrates 204 that are broken into segments, for instance from 0.25 inches in length to 40 inches in length. The segments are separated at break lines 222 that can be any width from a line-to-line cut, to widths up to 0.25 inches and greater. Integrating break lines 222 in substrates 204 can cause less stress to build up in substrates 204 between membrane sheets 24, 28 during the spiral wound element rolling process, thereby limiting damage to the membrane sheet in terms of poor flux or rejection characteristics.

Figure 18:
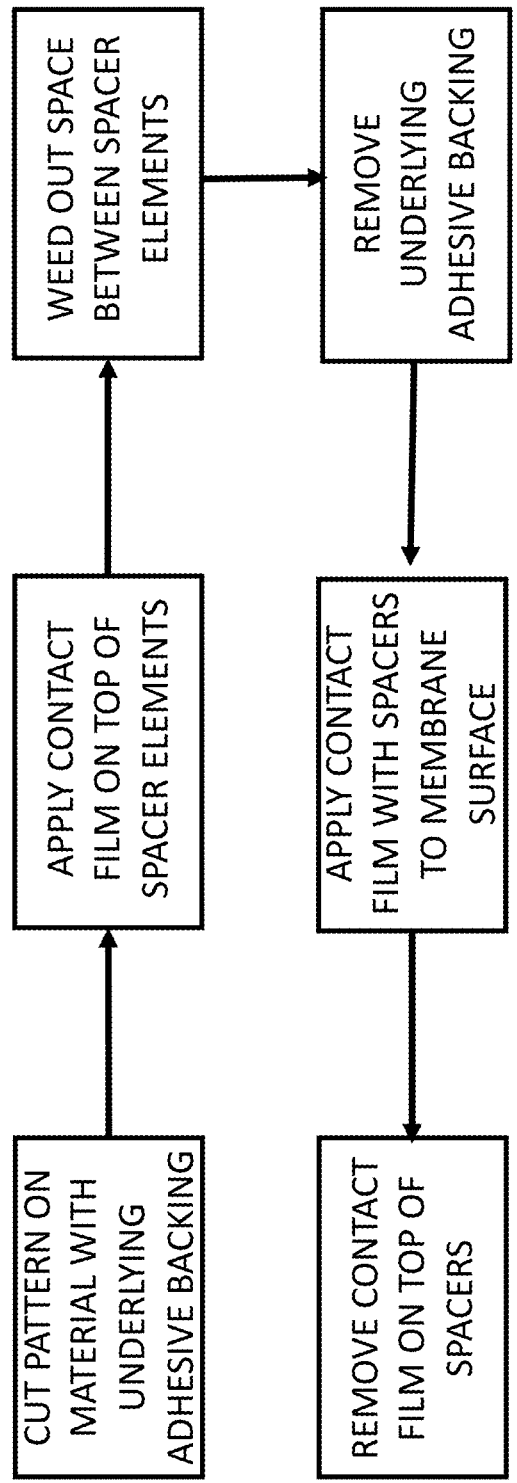
FIG. 18 is a diagram of the steps of stencil cutting features on a substrate.

FIG. 18 shows the steps involved in an example embodiment where vinyl (or other material) is cut out of a substrate to create a spacer material that can then be applied to a membrane surface. In the first step, a cutting machine is used to precisely cut a pattern in an overlying material that creates spacers in the material but does not cut into the underlying substrate. The overlying material will incorporate an adhesive that holds the overlying material on the substrate, but the adhesive on the overlying substrate will not transfer to the substrate when the substrate is removed from the overlying material. In the second step of FIG. 18, the unwanted overlying material is removed, or weeded out, of the overlying material to leave behind only the desired spacers, still attached to the underlying substrate. In the third step, an adhesive backed film is attached to the top of the spacers. The adhesive on the film is attached to the film such that it will not transfer to the spacers when the film is ultimately removed from the spacers. In step four of FIG. 18, the underlying substrate is removed from the bottom of the spacers leaving the adhesive bonded to the bottom of the spacers. In step five, the spacers with adhesive film attached on top of the spacers are applied to the appropriate location(s) on the membrane surface. The spacers, incorporating adhesive on the bottom, will bond the spacers to the membrane surface. In the sixth and final step in FIG. 18, the film, and adhesive attached to the film, is removed from the top of the spacers, thereby leaving the spacers bonded to the membrane surface.

Figure 19:
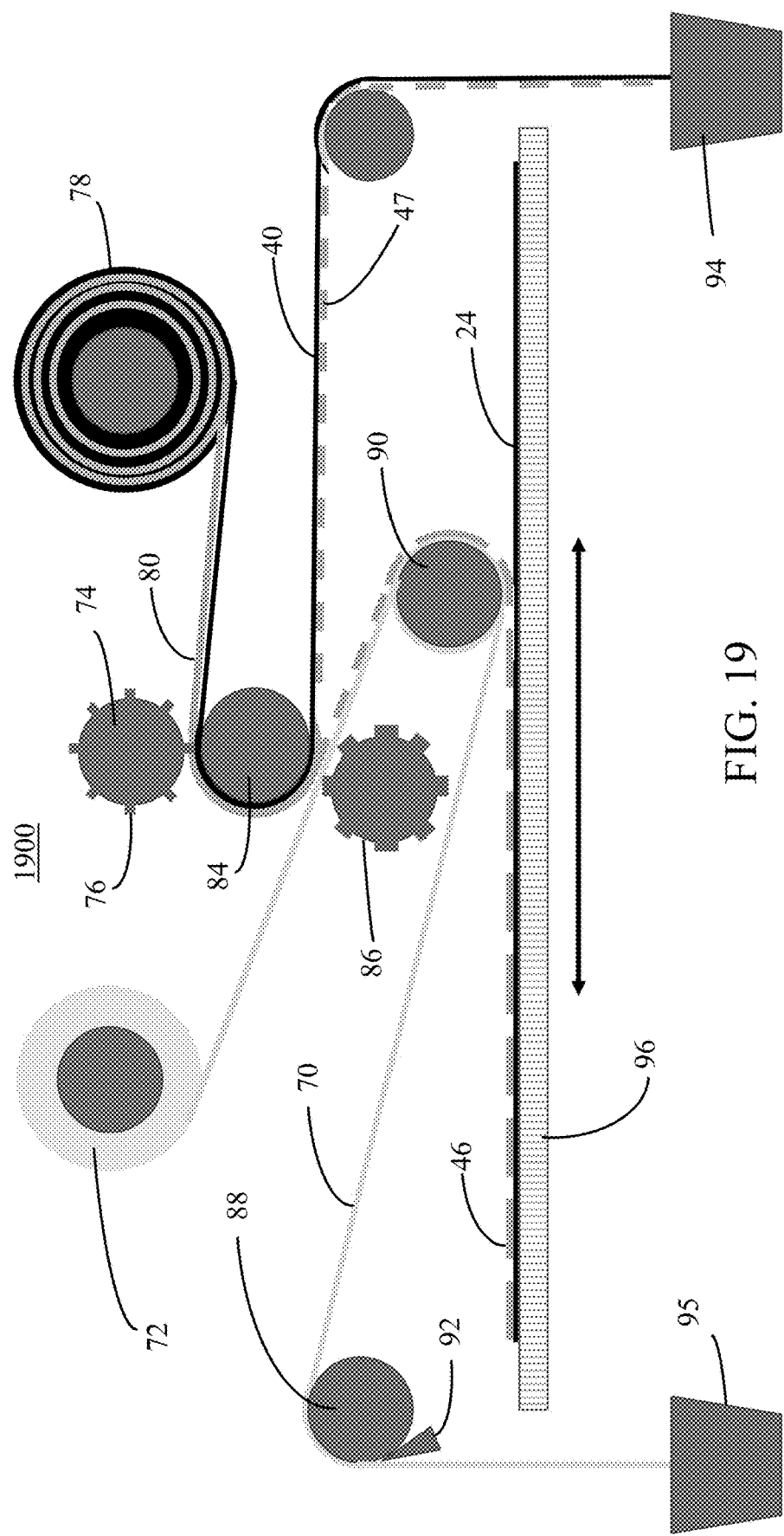
FIG. 19 is a view of an apparatus and method to stencil cut and apply spacer features to a membrane.

In an example embodiment of the present invention shown in FIG. 19, spacers 46 are applied to membrane 24 in an automated or semi-automated process. The process begins with a roll 78 of material 80 attached to substrate 40 with light adhesive coming off of a reel. The material enters between roller 84 and dye cutter 74 that comprises cutting dies 76. The die cut material continues around roller 84. Film 70 comes off of film reel 72. Embossing roller 86 impresses film 70 incorporating medium strength adhesive selectively to spacers 46 in die cut material 80. The stronger adhesive on film 70 separates spacers 46 from die cut material 80. Spacers 46 attached to film 70 proceed around roller 90 where roller 90 bonds spacers 46 to membrane 24. Adhesive on spacers 46 is stronger than the adhesive on film 70 and spacers thereby bond to membrane 24. Membrane 24 is mounted on vacuum table 96 that moves laterally to match the rotational speed of roller 90. Vacuum table 96 can also incorporate an up and down feature to allow disengagement of membrane 24 with spacers 46 attached, to start the next cycle. At the beginning and end of each cycle, membrane 24 can be placed/removed on vacuum table 96 by pick and place or robotic devices, or other means, to begin the next cycle. Substrate 40 with weeded out material 47 proceeds to discard bin 94. Film 70 proceeds over roller 88 to discard bin 95. Film separator 92 is utilized to ensure separation of film 70 from roller 88.

Figure 20:
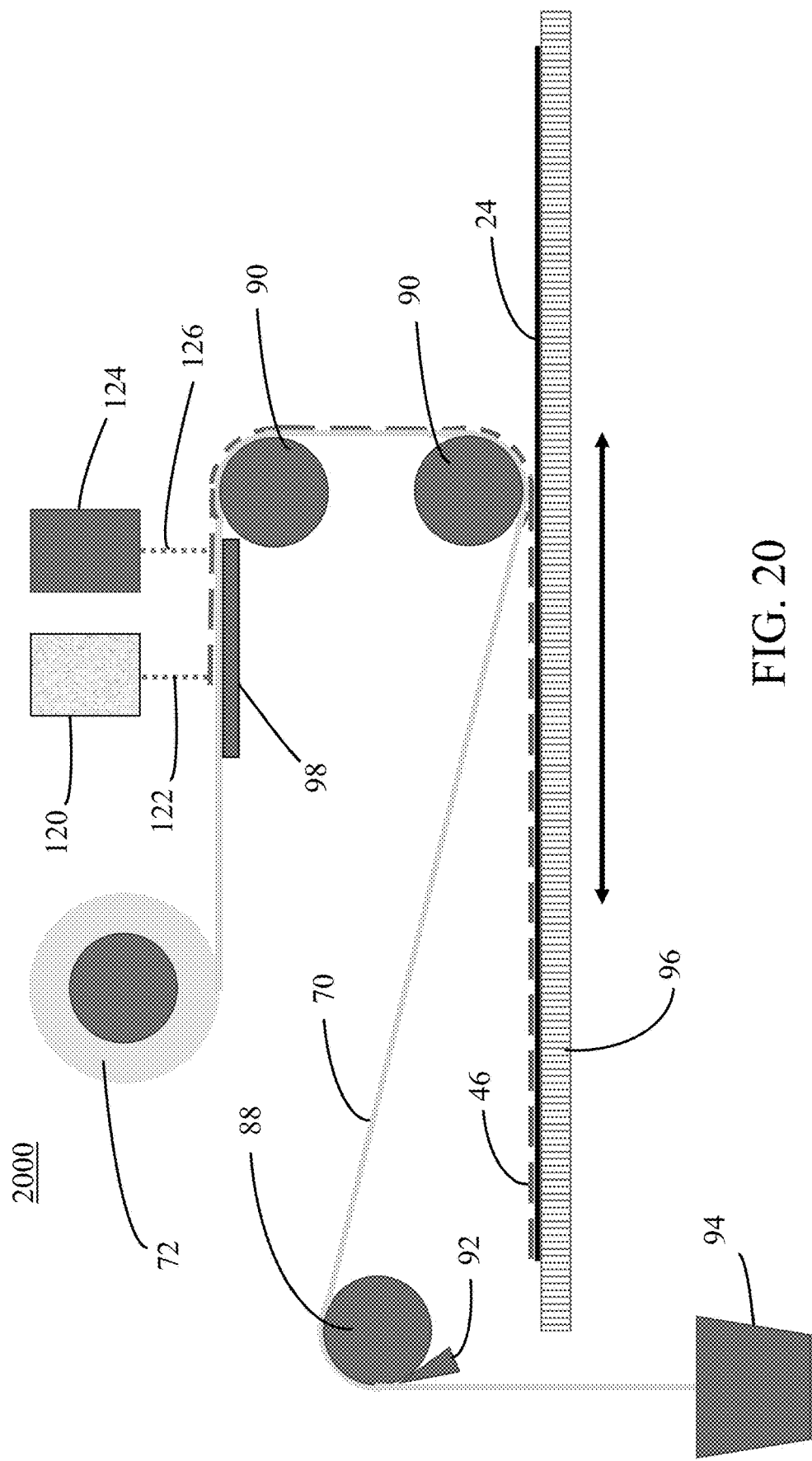
FIG. 20 is a view of a method to print or otherwise deposit spacer features on a substrate, apply adhesive to the spacer features, and apply those spacer features to a membrane.

FIG. 20 illustrates an example embodiment of the present invention that utilizes photopolymer, hot melt, or other techniques to apply spacers 46 to film 70 before proceeding to apply spacers 46 to membrane 24. Film 70, which optionally includes an adhesive coating, is dispensed from roll 72 of film 70 and proceeds to support platform 98 where material 122 is deposited on film 70 via dispensing mechanism 120. Material 122 can, e.g., comprise a liquid photopolymer material that is subsequently irradiated and hardened by an energy source. The energy source can include any wavelength spectrum of energy including visible light, ultraviolet light (UV) or other energy frequencies, suitable for the material. In an example embodiment of the present invention, material 122 can comprise a hot melt material that is deposited on film 70. Support platform 98 can incorporate a cooling feature to appropriately cool the hot melt material so that it assumes the correct dimensional characteristics, such as a desired thickness. As material 122 is hardened by an energy source, or cooled from support platform 98, or hardened by normal drying or curing methods to create the desired form, the forms are then configured in a shape to create spacers 46. Film 70 with spacers 46 attached now proceeds to have adhesive 126 applied to the surface of spacers 46. Adhesive 126 is dispensed from adhesive dispenser 124. Spacers 46 attached to film 70 now proceed via one or more rollers 90 to be attached to membrane sheet 24. Adhesive 126 has higher bond strength than the adhesive contact between film 70 and spacers 46. Hence, film 70 is removed from the back of spacers 46 at roller 90 as spacers 46 are bonded to membrane sheet 24. Membrane 24 can be mounted on vacuum table 96 that moves laterally to match the rotational speed of roller 90. Vacuum table 96 can also incorporate an up and down feature to allow disengagement of membrane 24 with spacers 46 attached, to start the next cycle. At the beginning and end of each cycle, membrane 24 is placed/removed on vacuum table 96 by pick and place or robotic devices, or other means, to begin the next cycle. Film 70 proceeds over roller 88 to discard bin 94. Film separator 92 is utilized to ensure separation of film 70 from roller 88. Film 70 can be recycled or discarded as appropriate.

Figure 21:
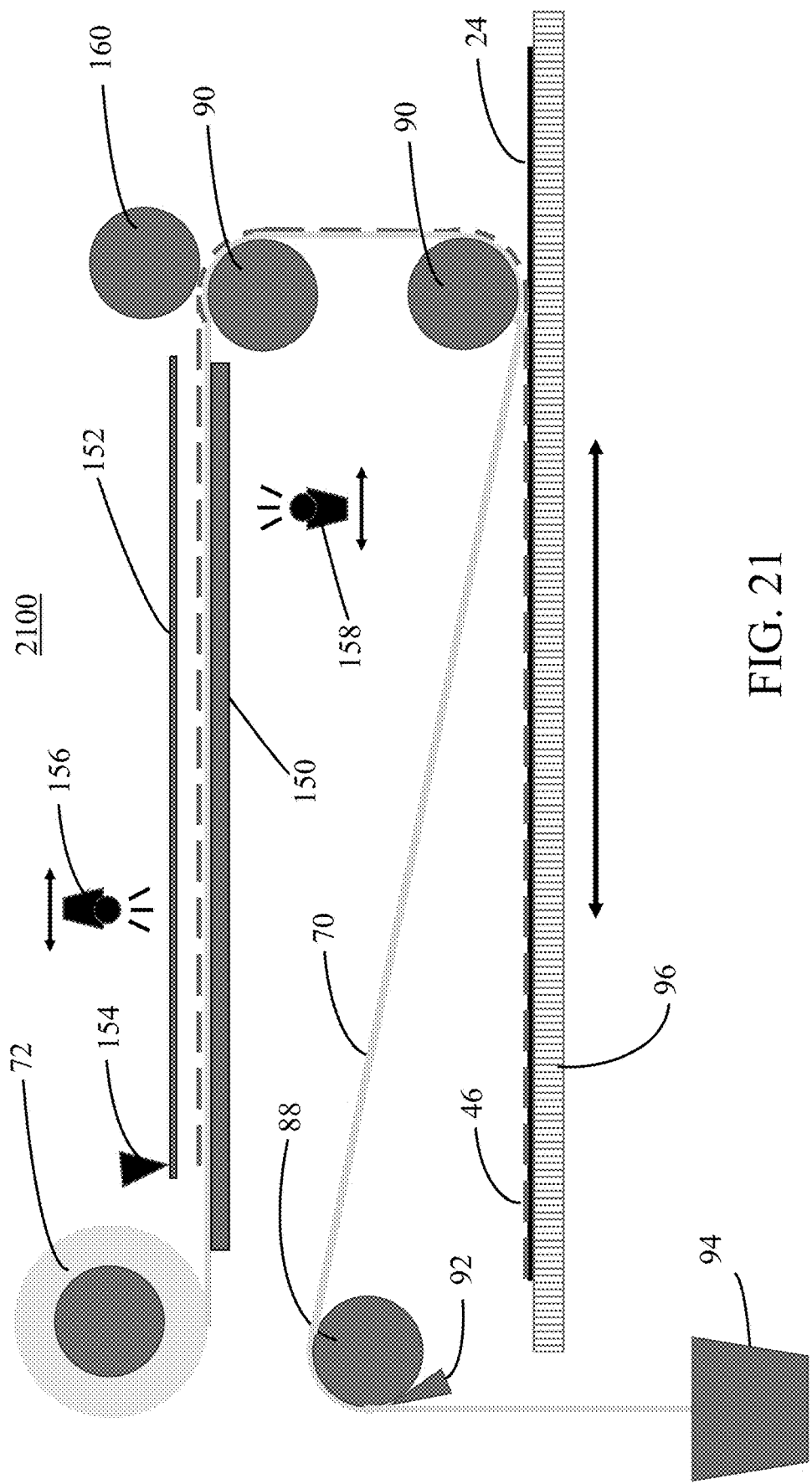
FIG. 21 is a view of an apparatus and method to screen print or gravure print spacer features on a substrate, apply adhesive to the spacer features, and apply those spacer features to a membrane.

In an example embodiment of the present invention shown in FIG. 21, spacers 46 are applied to film 70 utilizing a screen printing or stencil printing process. Screen 152 is placed over film 70 and adhesive is spread over screen 152 via screed 154 to fill spaces in screen 152 that form the desired shapes of spacers 46. Energy sources 158 and/or 156 are utilized to harden the adhesive to the desired hardness before removing screen 152 from the surface of film 70. Support table 150 is utilized to support film 70 during the screening process. Support table 70 can be transparent to allow energy from energy source 158 to reach the adhesive in the spaces of screen 152. Energy source 158 can be used to pre-cure the adhesive in the spaces of screen 152 in order to allow removal of screen 152 from the surface of film 70. A post curing process utilizing energy source 156 can be subsequently used to fully cure the adhesive to the appropriate strength to avoid tackiness of the adhesive. Film 70 with spacers 46 attached then proceeds over roller 90. In a coincident or subsequent process, adhesive is applied to the surface of spacers 46 via adhesive application device/roller 160. Film 70 with spacers 46 attached and adhesive applied to the surface proceed via rollers 90 to be applied to the surface of membrane sheet 24. Membrane 24 can be mounted on vacuum table 96 that moves laterally to match the rotational speed of roller 90. Vacuum table 96 can also incorporate an up and down feature to allow disengagement of membrane 24 with spacers 46 attached, to start the next cycle. At the beginning and end of each cycle, membrane 24 is placed/removed on vacuum table 96 by pick and place or robotic devices, or other means, to begin the next cycle. Film 70 proceeds over roller 88 to discard bin 94. Film separator 92 is utilized to ensure separation of film 70 from roller 88.

The present invention has been described in connection with various example embodiments. It will be understood that the above descriptions are merely illustrative of the applications of the principles of the present invention, the scope of which is to be determined by the claims viewed in light of the specification. Other variants and modifications of the invention will be apparent to those skilled in the art.

What is claimed is:

1. A method of producing a membrane element for fluid processing, comprising:
   (a) forming a spacer sheet comprising a first substrate sheet with a plurality of spacing features disposed thereon;
   (b) adhering the spacer sheet to a membrane sheet, wherein the spacer sheet is adhered to the membrane sheet such that the spacing features are adhered to the membrane sheet; and
   (c) separating the first substrate sheet from the spacing features after the spacing features are adhered to the membrane sheet, leaving the spacing features and not the first substrate sheet adhered to membrane sheet.

2. The method of claim 1, further comprising spiral winding the membrane element to form a spiral wound element.

3. The method of claim 1, further comprising placing the membrane element in a plate- and frame type membrane system.

4. A method of producing a membrane element for fluid processing, comprising:
   (a) forming a spacer sheet comprising a first substrate sheet with a plurality of spacing features disposed thereon by:
   (a1) joining a second substrate sheet to a first feature sheet at first surfaces thereof;
   (a2) cutting pattern portions into the first feature sheet from a second surface of the first feature sheet, where the second surface is opposite the first surface, where the cutting does not completely penetrate the first feature sheet;
   (a3) joining the first substrate sheet to the first feature sheet such that a first surface of the first substrate sheet is adjacent the second surface of the first feature sheet;
   (a4) separating the first substrate sheet and the cut pattern portions of the first feature sheet from the second substrate sheet, such that the cut pattern portions of the first feature sheet and the first substrate form the spacer sheet; and
   (b) adhering the spacer sheet to a membrane sheet.

5. The method claim 4, wherein the spacing features are shaped such that they have features on one or more ends that facilitate removal of unwanted interstitial material.

6. The method claim 4, wherein the spacing features are shaped having a portion that is a substantially straight line segment at an angle more than zero degrees and less than 90 degrees to an edge of the first substrate sheet.

7. The method of claim 4, further comprising spiral winding the membrane element to form a spiral wound element.

8. The method of claim 4, further comprising placing the membrane element in a plate- and frame type membrane system.

9. A method of producing a membrane element for fluid processing, comprising:
   (a) forming a spacer sheet comprising a first substrate sheet with a plurality of spacing features disposed thereon by depositing spacing features directly on and bonded to a surface of a second substrate sheet; adhering the first substrate sheet to the spacing features with a bond strength greater than that of the spacing features to the second substrate sheet; and then separating the second substrate sheet from the spacing features.

10. The method of claim 9, further comprising spiral winding the membrane element to form a spiral wound element.

11. The method of claim 9, further comprising placing the membrane element in a plate- and frame type membrane system.

\* \* \* \* \*